US006839511B2

(12) United States Patent
Nishida et al.

(10) Patent No.: US 6,839,511 B2
(45) Date of Patent: *Jan. 4, 2005

(54) CAMERA SYSTEM, CAMERA, ACCESSORY DEVICE AND METHOD FOR JUDGING AND CONTROLLING AN ACCESSORY DEVICE

(75) Inventors: Takao Nishida, Saitama (JP); Mamoru Sakashita, Hachioji (JP); Masataka Ide, Hachioji (JP); Makoto Harada, Hachioji (JP); Youji Watanabe, Fuchu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/616,394

(22) Filed: Jul. 8, 2003

(65) Prior Publication Data

US 2004/0052515 A1 Mar. 18, 2004

Related U.S. Application Data

(63) Continuation-in-part of application No. 10/352,621, filed on Jan. 28, 2003, now Pat. No. 6,738,574.

(30) Foreign Application Priority Data

| Jan. 31, 2002 | (JP) | 2002-024485 |
| Jan. 31, 2002 | (JP) | 2002-024486 |
| Jan. 31, 2002 | (JP) | 2002-024566 |
| Jul. 9, 2002 | (JP) | 2002-200213 |

(51) Int. Cl.[7] .............. G03B 7/26; G03B 5/00; G03B 15/05; G03B 17/18
(52) U.S. Cl. .............. 396/87; 396/155; 396/301; 396/529; 396/544; 396/266
(58) Field of Search .............. 396/87, 155, 266, 396/301, 388, 439, 529, 544

(56) References Cited

U.S. PATENT DOCUMENTS

| 4,803,509 A | * | 2/1989 | Nakai et al. .............. 396/170 |
| 4,814,812 A | | 3/1989 | Nakajima et al. |
| 2003/0142970 A1 | | 7/2003 | Nishida et al. |

FOREIGN PATENT DOCUMENTS

| CA | 2287365 A | 8/1999 |
| CN | 1263617 A | 8/2000 |
| JP | 1-221728 A | 9/1989 |
| JP | 07-168078 A | 7/1996 |
| JP | 11-249217 A | 9/1999 |

OTHER PUBLICATIONS

Chinese Office Action issued on Mar. 12, 2003 in counterpart Chinese application No. 03103175.1.

* cited by examiner

*Primary Examiner*—W. B. Perkey
(74) *Attorney, Agent, or Firm*—Frishauf, Holtz, Goodman & Chick, P.C.

(57) ABSTRACT

In a camera system according to the invention, a camera body and an interchangeable lens have respective identification data tables that are congruous with each other. As an appropriate data address is indicated to the interchangeable lens by the camera body, an identification data that is stored in the identification data storage section and corresponds to the indicated address is transmitted from the interchangeable lens to the camera body. The identification data judging section of the camera body compares the identification data transmitted back from the interchangeable lens and the identification data that is stored in the identification data storage section and corresponds to the address. As a result, it is determined if the dedicated accessory device is mounted on the camera body or not.

48 Claims, 14 Drawing Sheets

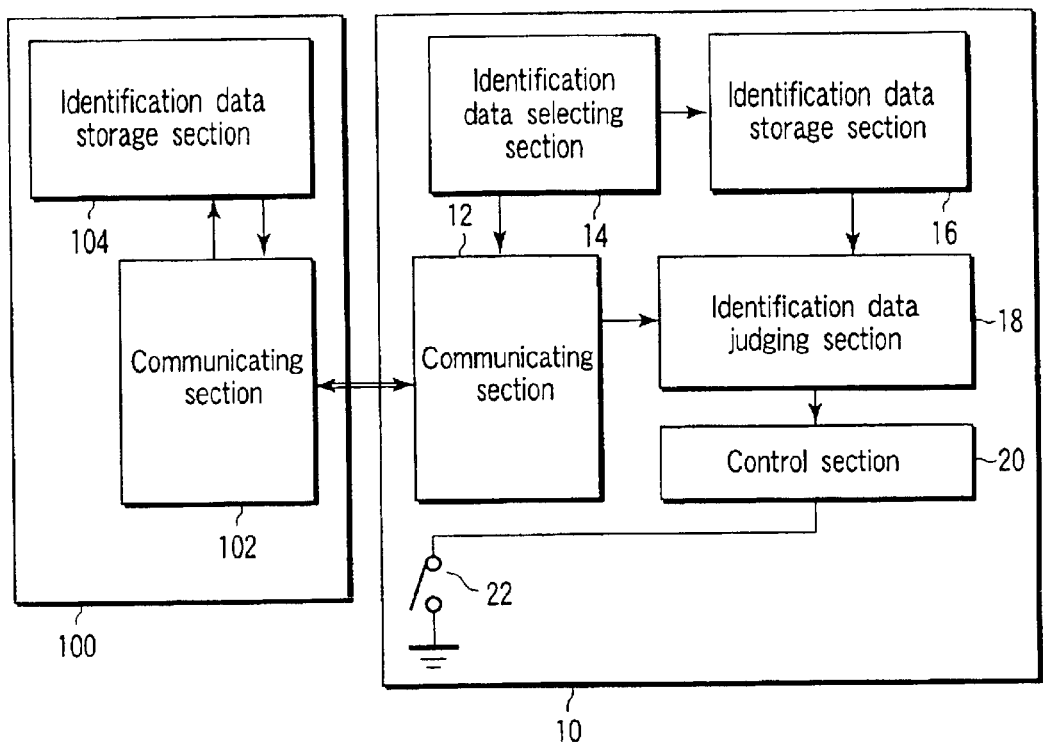
F I G. 1
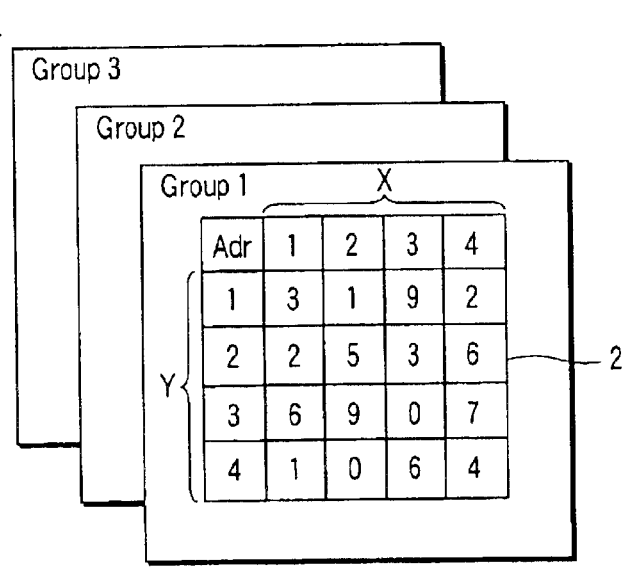
F I G. 2

| Data No. | Contents | Example |
|---|---|---|
| No.1 | Data No. of data to be used for arithmetic operation | 3 |
| No.2 | Numerical value data 1 | 7 |
| No.3 | Numerical value data 2 | 5 |
| No.4 | Numerical value data 3 | 9 |
| No.5 | Numerical value data 4 | 3 |
| No.6 | Numerical value data 5 | 8 |

FIG. 15

| Data No. | Contents | Example |
|---|---|---|
| No.1 | Arithmetic expressions identification data | 3 |
| No.2 | Data No. of data to be used for arithmetic operation | 2 |
| No.3 | Numerical value data 1 | 5 |
| No.4 | Numerical value data 2 | 9 |
| No.5 | Numerical value data 3 | 3 |
| No.6 | Numerical value data 4 | 8 |
| No.7 | Numerical value data 5 | 7 |

FIG. 19

CAMERA SYSTEM, CAMERA, ACCESSORY DEVICE AND METHOD FOR JUDGING AND CONTROLLING AN ACCESSORY DEVICE

CROSS-REFERENCE TO RELATED APPLICATIONS

This is a Continuation-in-Part application of U.S. patent application Ser. No. 10/352,621, filed Jan. 28, 2003, now U.S. Pat. No. 6,738,574 the entire contents of which are incorporated herein by reference.

This application is based upon and claims the benefit of priority from the prior Japanese Patent Applications No. 2002-024485, filed Jan. 31, 2002; No. 2002-024486, filed Jan. 31, 2002; No. 2002-024566, filed Jan. 31, 2002; and No. 2002-200213, filed Jul. 9, 2002, the entire contents of all of which are incorporated herein by reference.

BACKGROUND OF THE INVENTION

1. Field of the Invention

The present invention relates to a camera system comprising a camera body and camera accessories such as interchangeable lenses, to a camera body and accessory devices applicable to such a camera system and also to a method of judging and controlling an accessory device.

2. Description of the Related Art

Generally, camera accessories including an interchangeable lens and a flash unit are releasably arranged in the camera body.

When such a camera accessory is mounted on the camera body, they communicate with each other. It becomes possible to exploit the accessory mounted on the camera body maximally for performance as a result of the communication. In other words, if the accessory is adapted to the camera body on which it is mounted, the accessory can be exploited optimally for performance.

As related art in this field of technology, Japanese Patent Application KOKAI Publication No. 1-221728 discloses a camera with which a number of interchangeable lenses can selectively be used, wherein each of the interchangeable lenses is provided with a memory means for storing identification data and lens category data of the group of lenses to which it belongs. The camera body is adapted to appropriately control the lens that is mounted on it according to the data stored in the lens.

BRIEF SUMMARY OF THE INVENTION

In the first feature of the present invention, there is providing a camera system including a camera body and an accessory device to be releasably mounted on the camera body, the system comprising:

a camera side identification data table held by the camera body;

an accessory device side identification data table held by the accessory device and congruous with the camera side identification data table;

a specifying section arranged in the camera body to specify an appropriate data address to the accessory device;

a transmitting section arranged in the accessory device to transmit identification data stored in the accessory device side identification data table at the data address specified by the specifying section to the camera body; and a judging section arranged in the camera body to determine if a dedicated accessory is mounted or not by comparing the identification data transmitted back from the accessory device and the identification data stored in the camera side identification data table at the address corresponding to the data address.

In the second feature of the invention, there is provided an accessory device to be releasably mounted on a camera body having a functional feature of determining if an accessory device designed to be dedicated to the camera body is mounted on it or not, the accessory device comprising:

an identification data table held congruous with the camera side identification data table provided in the camera body; and a transmitting section that selects identification data in the identification data table and transmits it to the camera body in response to a specification by the camera body.

In the third feature of the invention, there is provided a camera body having a functional feature of determining if an accessory device designed to be dedicated to it is mounted on it or not, the camera body comprising:

an identification data table congruous with the accessory device side identification data table held by the accessory device;

a specifying section that specifies an appropriate data address to the accessory device; and a judging section that determines if the dedicated accessory device is mounted on it or not by comparing the identification data corresponding to the specified data address of the accessory device side identification data table and transmitted back from the accessory device according to the specification by the specifying section and the identification data stored in the camera side identification data table and corresponding to the address.

In the fourth feature of the invention, there is provided a camera system including a camera body and an accessory device to be releasably mounted on the camera body, the system comprising:

a camera side memory section arranged in the camera body to store identification data congruous with the identification data stored in the accessory device;

an accessory device side memory section arranged in the accessory device to store identification data congruous with the identification data stored in the camera body;

a detecting section that detects a predetermined operation by the user;

a comparing section arranged in the camera body to receive the identification data from the accessory device in response to the detection by the detecting section of a predetermined operation and compare the identification data with the corresponding camera side identification data; and a judging section that judges if the dedicated accessory device is mounted on the camera body according to the result of the comparison by the comparing section.

In the fifth feature of the invention, there is provided a camera system of a combination of a camera body and an accessory device, the camera system comprising:

a communicating section arranged in the camera body to communicate with a specific accessory device according to a predetermined communication protocol;

a discriminating section arranged in the camera body to determine if the accessory device coupled to it holds a predetermined quantity indicating a state of a pre-selected electric phenomenon; and a holding section arranged in the accessory device to hold the predetermined quantity indicating the state of the pre-selected electric phenomenon in a form recognizable to the discriminating section in the camera body.

In the sixth feature of the invention, there is provided a camera body applicable to a camera system of a combination of a camera body and an accessory device, the camera body comprising:

a communicating section that communicates with a specific accessory device according to a predetermined communication protocol; and a discriminating section that determines if the accessory device coupled to it holds a predetermined quantity indicating a state of a pre-selected electric phenomenon or not.

In the seventh feature of the invention, there is provided a camera system including a camera body and a camera accessory to be releasably mounted on the camera body, the system comprising:

a camera side arithmetic section arranged in the camera body to store an arithmetic expression to be used for performing predetermined arithmetic operation;

an accessory side arithmetic section arranged in the accessory to store an arithmetic expression congruous with the arithmetic expression of the camera side arithmetic section;

an arithmetic operation data outputting section arranged in the camera body to output arithmetic operation data common to the camera side arithmetic section and the accessory side arithmetic section;

a judging section arranged in the camera body to compare the outcome of the arithmetic operation performed by the camera side arithmetic section and that of the arithmetic operation performed by the accessory side arithmetic section and judge that the right accessory is mounted on the camera body when the outcomes agree with each other.

In the eighth feature of the invention, there is provided a camera to which an accessory to be releasably mounted, the camera comprising:

a camera side arithmetic section that stores an arithmetic expression congruous with the arithmetic expression stored in an accessory side arithmetic section possessed by the accessory;

an arithmetic operation data outputting section that outputs arithmetic operation data to the accessory side arithmetic section and the camera side arithmetic section;

a judging section that receives an outcome of the arithmetic operation of the camera side arithmetic section and that of the arithmetic operation of the accessory side arithmetic section and judges if the accessory is the right accessory or not by comparing the outcomes.

In the ninth feature of the invention, there is provided a judgment control method to be used by an accessory that is to releasably mounted on a camera body, the method comprising:

receiving at the accessory side a plurality of numerical value data from the camera body;

selecting a data to be used for an arithmetic operation for judgment control of the accessory out of the plurality of numerical value data;

performing the arithmetic operation for judgment control of the accessory, using the selected data; and transmitting the outcome of the arithmetic operation for judgment control to the camera body.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a functional block diagram of the first embodiment of camera system according to the invention, illustrating its configuration on the basis of signal flow;

FIG. 2 is a schematic illustration of identification data tables that may be stored in the identification data storage section 16 and the identification data storage section 104 of FIG. 1;

FIG. 15 is a schematic illustration of the table format of data to be used for arithmetic operations in the third embodiment of the invention;

FIG. 19 is a schematic illustration of the table format of data to be used for arithmetic operations in the fourth embodiment of the invention.

DETAILED DESCRIPTION OF THE INVENTION

Figure 3:
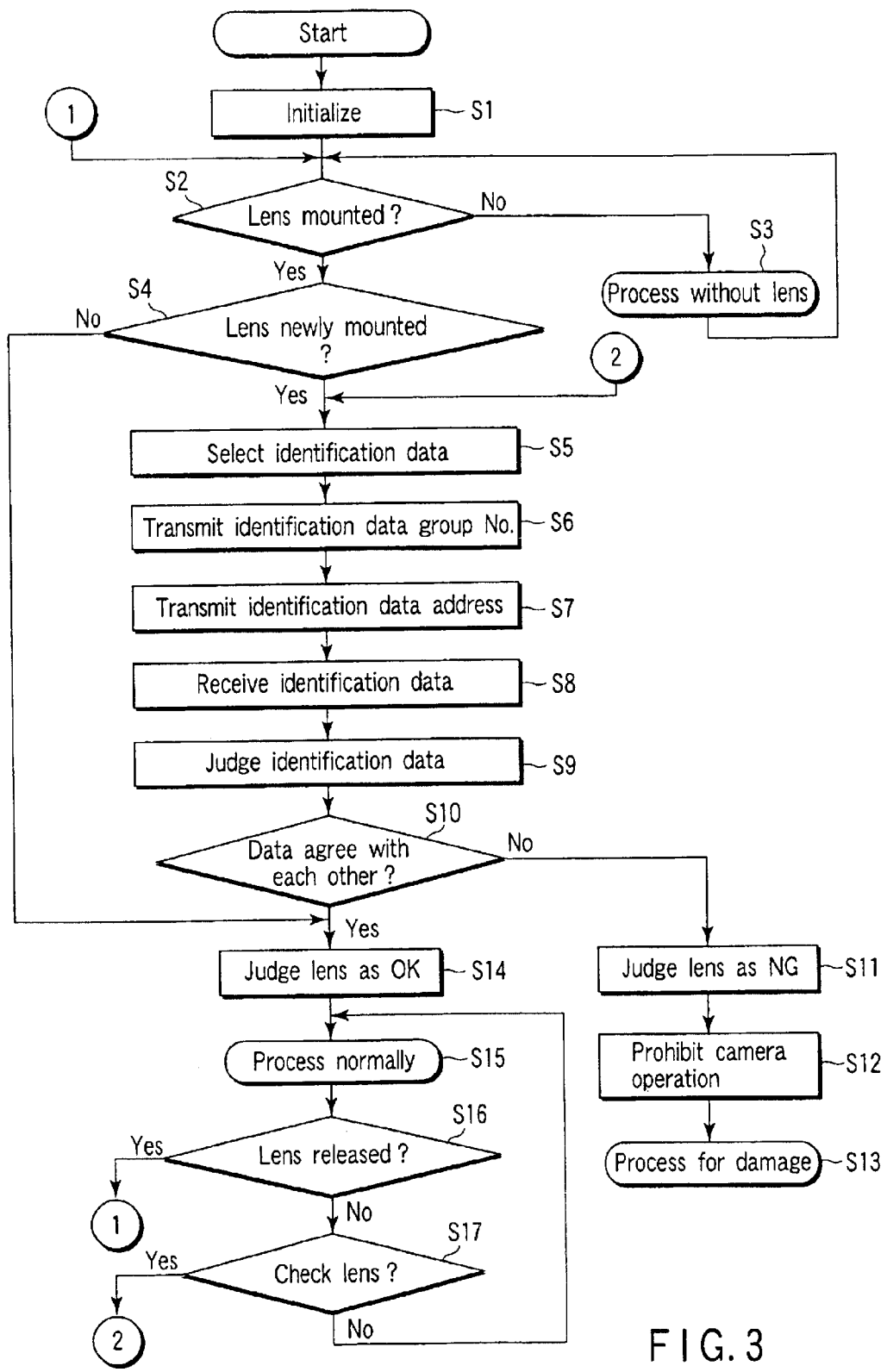
FIG. 3 is a flow chart of the operation of the camera body 10 of the first embodiment of camera system according to the invention.

Now, preferred embodiments of the present invention will be described by referring to the accompanying drawing.

FIG. 1 is a functional block diagram of the first embodiment of camera system according to the invention, illustrating its configuration in terms of signal flow.

Referring to FIG. 1, the camera system comprises a camera body 10 and an interchangeable lens 100, which is a camera accessory releasably mounted on the camera body 10.

The camera body 10 includes a communicating section 12 to be used for data communication with the interchangeable lens 100, an identification data selecting section 14, an identification data storage section 16, an identification data judging section 18, a control section 20 and a lens mounting/releasing switch (SW) 22.

On the other hand, the interchangeable lens 100 is releasably mounted on the camera body 10 and includes a communicating section 102 for communicating with the camera body 10 and an identification data storage section 104.

The communicating section 12 communicates with the interchangeable lens 100. As will be described in detail, it transmits a group number and an address as identification data necessary for identifying the interchangeable lens 100 and receives identification data corresponding to the group number and the address from the interchangeable lens 100.

The identification data selecting section 14 is adapted to select the group number and the address as identification data. The identification data storage section 16 sorts out identification data by way of group numbers and addresses and stores them.

The identification data judging section 18 is adapted to compare the identification data relating to a group number and an address and input from the communicating section 12 and the identification data relating to a group number and an address and read out from the identification data storage section 16 and determine if they agree with each other or not.

The first matching determining means comprises the identification data selecting section 14, the identification data storage section 16 and the identification data judging section 18.

The lens mounting/releasing switch 22 is a switch for detecting if the interchangeable lens 100 is mounted on the camera body 10 or not.

The control section 20 allows the camera to operate properly when a matching interchangeable lens 100 is coupled to the camera body or prohibits the latter from operating when an interchangeable lens 100 that is not matching the camera body is coupled to the latter in response to the result of the detection of the lens mounting/releasing switch 22 and that of the judgment of the identification data judging section 18.

Note that, the control section 20 comprehensively controls only the camera body 10 when an interchangeable lens 100 is not coupled to the camera body 10, whereas it comprehensively controls the entire camera system including an interchangeable lens 100 when the latter matches and is coupled to the camera body 10.

The communicating section 102 of the interchangeable lens 100 operates to read the identification data corresponding to the group number and the address received from the communicating section 12 of the camera body 10 out of the identification data storage section 104 and transmits it back to the communicating section 12 of the camera body 10.

The identification data storage section 104 sorts out identification data by way of group numbers and addresses and stores them.

Both the identification data storage section 16 of the camera body 10 and the identification data storage section 104 of the interchangeable lens 100 store identification data that are common to the camera body 10 and the interchangeable lens 100 and hence same and identical. An identification data is produced by using a plurality of identification data tables. For example, an identification data may be produced by using three random identification data tables as shown in FIG. 2.

FIG. 2 is a schematic illustration of identification data tables. As descried above, the identification data stored in the identification data storage section 16 and the corresponding data stored in the identification data storage section 104 are sorted into groups according to group numbers including Group 1, Group 2, Group 3 and so on. Additionally, the data are stored in the two-dimensional regions of each of the groups and the two-dimensional regions are defined, for instance, by horizontal Addresses X and vertical Addresses Y. Thus, the tables look like code tables.

In the instance of FIG. 2, the values of vertical Addresses Y are found within a range between 1 and 4. Similarly, the values of horizontal Addresses X are found within a range between 1 and 4. Thus the identification data is stored at 4×4=16 addresses that are expressed by combinations of vertical and horizontal Addresses (X, Y).

For example, if "1" is specified for Group (out of Group 1, Group 2 and Group 3 in FIG. 2) of the identification data tables and "2" and "2" are specified respectively for Address X and Address Y, an identification data of "5" is defined. The identification data selecting section 14 specifies (selects) the group number of the identification data tables and Addresses (X, Y).

The data defined by means of the specified group number and address is then sent to the identification data judging section 18. As described above, the identification data judging section 18 judges if the data selected in a manner as described above and stored in the identification data storage section 16 and the data stored in the identification data storage section 104 of the interchangeable lens 100 and transmitted to it by way of the communicating sections 102 and 12 agree with each other or not.

Note again that the identification data stored in the identification data storage section 104 of the interchangeable lens 100 is selected by using the group number and the addresses selected by the identification data selecting section 14 of the camera body 10.

The control section 20 controls the operation of the camera according to the judgment of the identification data judging section 18. The control section 20 is coupled to the lens mounting/releasing switch (SW) 22 for detecting if the interchangeable lens 100 is mounted or released. Thus, the control section 20 is notified of the timing at which the interchangeable lens 100 is mounted or released.

Now, the operation of selecting an identification data stored in the identification data storage section 16 will be described below.

For the operation of selecting an identification data, the group number and the addresses are sequentially incremented. For example, if "1" is specified for Group of the identification data tables and "1" and "1" are specified respectively for Address X and Address Y for the first round, "2" is specified for Group and "2" and "2" are specified respectively for Address X and Address Y, although an identification data may be selected in a different way as will be discussed below.

First, an identification data may be switched to another as a function of time. For example, the groups and the addresses of the identification data tables may be switched to other ones every day.

Second, an identification data may be switched to another as a function of the data stored in the interchangeable lens 100. For example, an identification data may be selected by referring to the number specifically allocated to the lens or to the type of the lens.

Third, an identification data may be switched to another as a function of the data stored in the camera body 10. For instance, the data may be stored when the camera body is manufactured.

Fourth, an identification data may be selected by using a random number. It may be so arranged that the camera body 10 generates a random number each time the camera is operated and transmits the random number to the interchangeable lens 100.

Of the above described identification data storage section 16 and the identification data storage section 104, a writable memory may be used at least for the identification data storage section 104.

Now, the processing operation of the above described embodiment of camera system will be described by referring to the flow charts of FIGS. 3 and 4.

Firstly, the processing operation of the camera body 10 will be described by referring to the main flow chart of the camera body 10.

As the camera body 10 is powered typically by means of a battery (not shown) to start the sequence of the processing operation. Firstly, the camera system is initialized for operation in Step S1. The initialization may include selection of a port. Then, in Step S2, it is determined if an interchangeable lens 100 is mounted on the camera body 10 or not according to the result of the detecting operation of the lens mounting/releasing switch 22.

If it is determined in Step S2 that an interchangeable lens 100 is not mounted on the camera body 10, the processing operation proceeds to Step S3, in which a process without a lens is conducted. Subsequently, the processing operation goes back to Step S2. If, on the other hand, it is determined in Step S2 that an interchangeable lens 100 is mounted, the processing operation proceeds to Step S4.

In Step S4, it is determined if the interchangeable lens 100 is newly mounted on the camera body 10 (in other words changed) or it has been mounted for sometime. If it is determined that the interchangeable lens 100 is newly mounted, a specific processing operation of identifying the lens is conducted in steps starting from Step S5. If, on the other hand, it is determined that the interchangeable lens 100 has been mounted for sometime, the processing operation proceeds to Step S14.

In Step S5, an identification data is selected. More specifically, an identification data stored in the identification data storage section 16 is selected by the identification data selecting section 14 in the camera body 10. To do this, a group number and an address data are specified by means of the identification data tables as shown in FIG. 2.

Subsequently, in Step S6, the group number of the identification data selected in Step S5 is transmitted from the camera body 10 to the interchangeable lens 100. This step, or Step S6, corresponds to Step S24 in the flow chart of FIG. 4, which will be described in detail hereinafter.

Then, in Step S7, Addresses X and Y of the identification data selected in Step S5 are transmitted from the camera body 10 to the interchangeable lens 100 similarly to Step S6. Again, this step, or Step S7, corresponds to Step S25 in the flow chart of FIG. 4, which will also be described in detail hereinafter.

Thereafter, in Step S8, the identification data transmitted from the interchangeable lens 100 in response to the above described identification data transmitted in Steps S6 and S7 is received by the camera body 10. Then, the received identification data is judged in Step S9. More specifically, the identification data stored in the identification data storage section 16 of the camera body 10 is compared with the identification data transmitted from the interchangeable lens 100 in Step S8.

In Step S10, it is determined if the two identification data agree with each other or not. If the identification data do not agree with each other, the processing operation proceeds to Step S11, where the interchangeable lens 100 is judged to be no good (NG). Then, any subsequent operation for driving the camera is prohibited in Step S12. Subsequently, the processing operation proceeds to Step S13, where a damage processing operation is conducted so as to make the camera system reject any user operation.

If, on the other hand, it is determined in Step S10 that the identification data agree with each other, the processing operation proceeds to Step S14, where the interchangeable lens 100 is judged to be OK. Then, the camera system is driven to operate properly in Step S15.

Then, in Step S16, it is determined if the interchangeable lens 100 is released or not. The processing operation goes back to Step S2 when it is determined that the interchangeable lens 100 is released, whereas the processing operation proceeds to Step S17 when it is determined that the interchangeable lens 100 is not released.

In Step S17, it is determined if the operation of identifying the interchangeable lens 100 is to be conducted or not. This operation of identifying the lens will be conducted in response to a user's manual operation of turning on the power switch, the release switch or the like.

If it is determined that the operation of identifying the lens is to be conducted, the processing operation moves to Step S5 and the succeeding steps are followed. If, on the other hand, it is determined that the operation of identifying the lens is not to be conducted, the processing operation goes to Step S15 to follow the procedure of the normal processing operation. Thereafter, the processing operation proceeds to Step S16 and the ordinary processing loop is repeatedly followed except when the processing operation for releasing the lens or that of checking the lens is conducted in Step S16 or S17, whichever appropriate.

Figure 4:
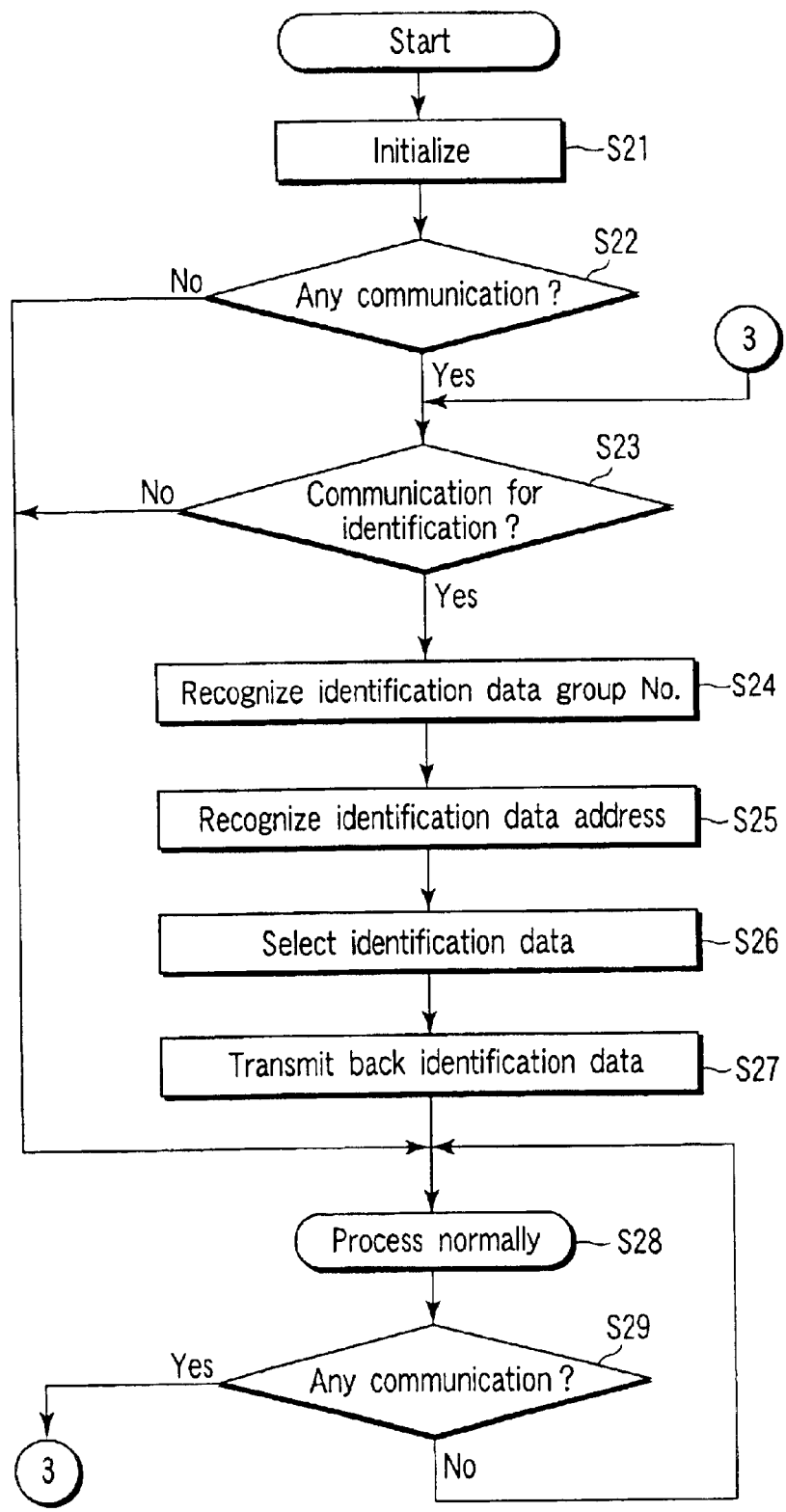
FIG. 4 is a flow chart of the operation of the interchangeable lens 100 of the first embodiment of camera system according to the invention.

Now, the processing operation of the interchangeable lens 100 will be described by referring to the main flow chart of the interchangeable lens 100 as shown in FIG. 4.

In this sequence, firstly, the interchangeable lens 100 is initialized for operation in Step S21. The initialization may typically include selection of a port. Then, a communication check is conducted in Step S22. A communication check is an operation of the communicating section 102 in the interchangeable lens 100 for checking if there is a request for communication issued from the camera body 10 or not. The processing operation proceeds to Step S28 when there is no request for communication, whereas it proceeds to Step S23 when there is a request for communication.

Then, in Step S23, it is determined if there is a transmission for identification data or not. If it is determined in Step S23 that there is no transmission for identification data, the processing operation proceeds to Step S28. If, on the other hand, it is determined in Step S23 that there is a transmission for identification data, the processing operation proceeds to Step S24.

In Step S24, the group number of the identification data transmitted from the camera body 10 in Step S6 of the flow chart of FIG. 3 is recognized by the interchangeable lens 100. Similarly, in Step S25, Addresses X and Y of the identification data transmitted from the camera body 10 in Step S7 of the flow chart of FIG. 3 is recognized by the interchangeable lens 100.

Then, in Step S26, an identification data stored in the identification data storage section 104 in the interchangeable lens 100 is selected by means of the above described group number and Addresses X and Y. Thereafter, in Step S27, the identification data selected in Step S26 is transmitted back from the interchangeable lens 100 to the camera body 10.

Subsequently, in Step S28, the ordinary processing operation of the interchangeable lens 100 is conducted. Then, in Step S29, it is determined if there is a communication or not. If it is determined that there is a communication, the processing operation proceeds to Step S23 for the above described operation of communication check. If, on the other hand, it is determined that there is no communication, the processing operation proceeds to Step S28 for the ordinary processing loop.

While any subsequent operation for driving the camera is prohibited when the lens is judged to be NG in Steps S11 and S12 in the flow chart of FIG. 3 in the above description of the embodiment, the embodiment is by no means limited to such an arrangement. For example, it may alternatively be so arranged that the fact that the lens is NG is notified instead of prohibiting the operation of driving the camera. Still alternatively, the normal procedure of the processing operation may be followed, while limiting the use of some of the functional features.

The damage processing operation in Step S13 of the flow chart of FIG. 3 may be a halt of the operation of the interchangeable lens 100.

While both the identification data storage section 16 of the camera body 10 and the identification data storage section 104 of the interchangeable lens 100 store identification data that are common to the camera body 10 and the interchangeable lens 100 and hence same and identical in the above description of the embodiment, the identification data stored in the storage sections may not necessarily be so if the identification data stored in the identification data storage section 104 of the interchangeable lens 100 at least include the identification data stored in the identification data storage section 16 of the camera body 10.

While the camera accessory that can be releasably mounted on the camera body 10 is an interchangeable lens 100 in the above description of the embodiment, the interchangeable accessory may alternatively be a flash unit, a battery pack or something else.

While the identification data of the camera body 10 and that of the interchangeable lens 100 are collated (to recognize the lens) when the lens is changed in the above description of the first embodiment, it may alternatively be so arranged that the user can select the timing for collating the two identification data.

As described above, it is now possible to determine if the camera accessory mounted on the camera body of the first embodiment of the present invention is one that is designed so as to be dedicated to the camera body or not.

Now, the second embodiment of the invention will be described below.

The second embodiment is a camera system comprising a camera body and an interchangeable lens, in which the proper applicability of the interchangeable lens to the camera body can be precisely determined. The second embodiment is also designed to provide a camera body and an interchangeable lens that are applicable to the camera system.

Figure 5:
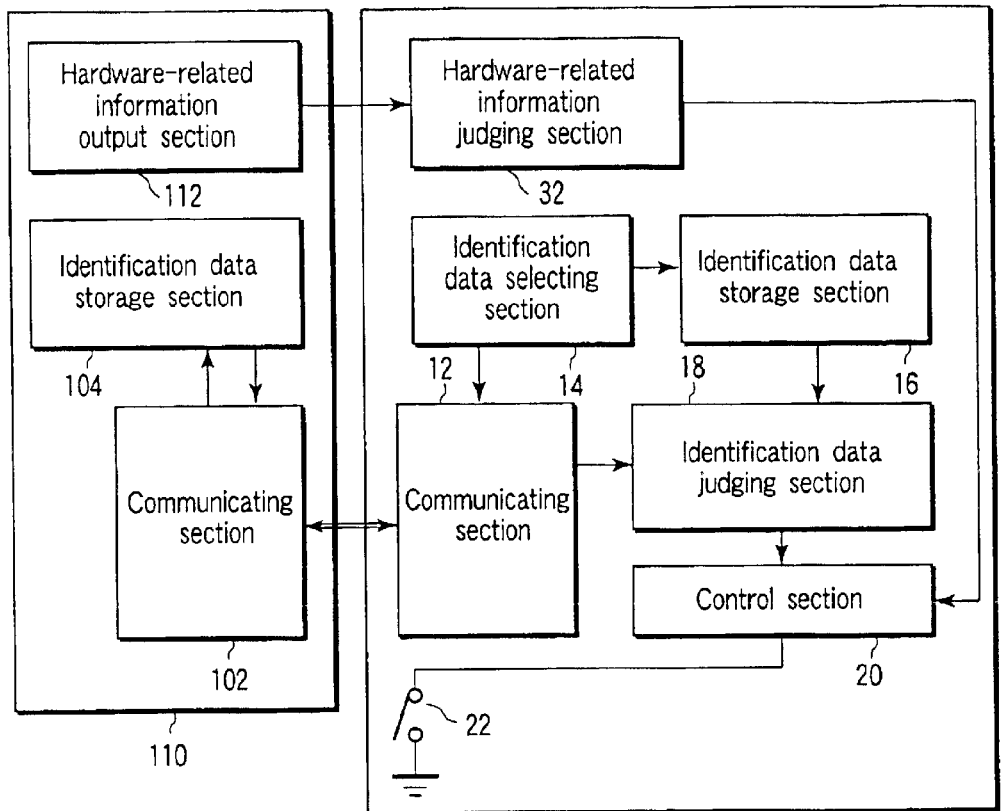
FIG. 5 is a block diagram of the second embodiment of camera system according to the invention, illustrating its configuration.

FIG. 5 is a block diagram of the second embodiment of camera system according to the invention, illustrating its configuration. The components similar or identical to those of the first embodiment are designated at the same reference numerals and will not be described in detail.

The camera system comprises a camera body 30 and an interchangeable lens 110 that can be releasably mounted on the camera body 30 by way of a lens mount or the like.

The camera body 30 includes a communicating section 12, an identification data selecting section 14, an identification data storage section 16, an identification data judging section 18, a control section 20, a lens mounting/releasing switch (SW) 22 and a hardware-related information judging section 32.

On the other hand, the interchangeable lens 110 is releasably mounted on the camera body 30 and includes a communicating section 102 for communicating with the camera body 30, an identification data storage section 104 and a hardware-related information output section 112.

The hardware-related information judging section 32 is means for judging the hardware-related information output from the interchangeable lens 110 when the interchangeable lens 110 is mounted on the camera body 30. It operates as second matching determining means. The control section 20 allows the camera to operate properly when a matching interchangeable lens 110 is connected to the camera body or prohibits the latter from operating when an interchangeable lens 110 that is not matching the camera body is connected to the latter in response to the result of the judgment of the hardware-related information judging section 32, that of the detection of the lens mounting/releasing switch 22 and that of the judgment of the identification data judging section 18.

The hardware-related information output section 112 is designed to operate as state-indicating quantity holding means that is adapted to output hardware-related information to the hardware-related information judging section 32 of the camera body 30.

The hardware-related information is output as quantity indicating the state of the electric phenomenon selected to maintain a specific relationship with an attribute of the interchangeable lens 110. The attribute of the interchangeable lens 110 may be its focal length, a physical quantity that is provided in advance in it and can be used to identify it, or its product number.

The quantity indicating the state of the electric phenomenon may be an electric current value, a voltage value, an electric resistance value, an electric capacitance value, a frequency value or the duty factor of an electric value that changes cyclically.

Now, the arrangement for judging hardware-related information will be described by referring to FIGS. 6 through 9.

Figure 6:
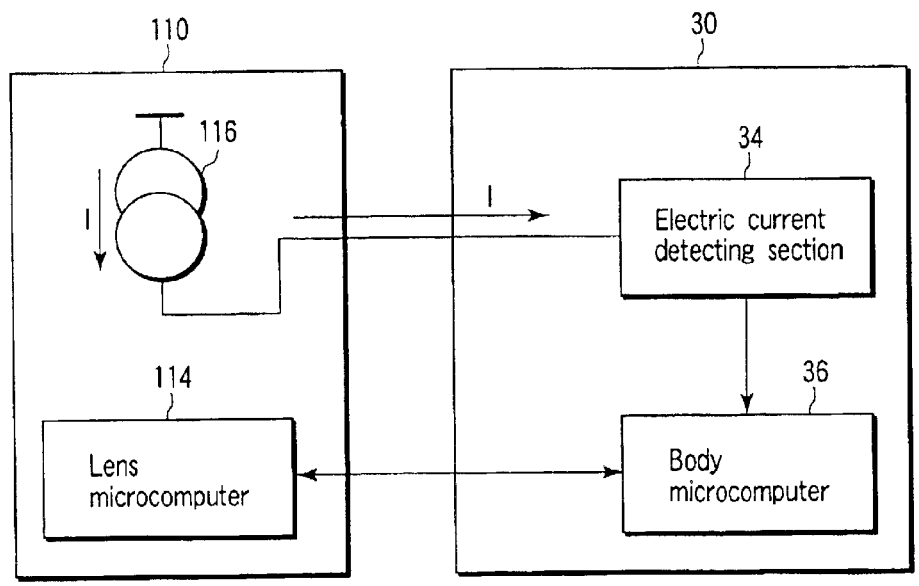
FIG. 6 is a block diagram of the second embodiment of the invention, illustrating an example of arrangement that is adapted to detect and determine an electric current value as hardware-related information.

FIG. 6 is a block diagram illustrating an example of arrangement that is adapted to detect and determine an electric current value as hardware-related information.

The interchangeable lens 110 comprises a lens microcomputer 114 that includes a communicating section 102 and an identification data storage section 104 and a constant current source 116 that corresponds to the hardware-related information output means 112 and operates as state-indicating quantity holding means. The constant current source 116 is adapted to output a constant current I showing a value that corresponds to the attribute of the interchangeable lens 110.

More specifically, the constant current source 116 outputs a constant electric current I that represents the type of the interchangeable lens, e. g., the 28–105 mm zoom lens or the 100 mm macro-lens or the ID number or the product number (or part of the number) of the interchangeable lens that is stored in the EEPROM or the like (not shown) at the time when the interchangeable lens is manufactured.

On the other hand, the camera body 30 comprises an electric current detecting section 34 that operates as second matching determining means and corresponds to the hardware-related information judging section 32 and a body microcomputer 36 that includes the communicating section 12, identification data selecting section 14, identification data storage section 16, identification data judging section 18 and control section 20.

The electric current detecting section 34 is adapted to detect the value of the constant electric current I output from the constant current source 116 and output the detected value. The body microcomputer 36 determines if the connected interchangeable lens 110 matches the camera body on the basis of the electric current value detected by the electric current detecting section 34 and, if it is determined that the interchangeable lens 110 matches the camera body, it also operates as communicating means, coding means and first matching determining means so as to determine the attribute of the interchangeable lens 110 and perform a control operation suited for the interchangeable lens 110 on the basis of the determined attribute.

The body microcomputer 36 has a data base that is necessary for the attribute of the matching interchangeable lens 110. Additionally, the body microcomputer 36 determines if the electric current value detected by the electric current detecting section 34 agrees with one of the electric current values stored in the data base or not and then if the connected interchangeable 110 is a matching lens or not on the basis of agreement or disagreement. Furthermore, the body microcomputer 36 determines the attribute of the connected interchangeable lens 110 by collating the electric current value with the values stored in the data base.

Figure 7:
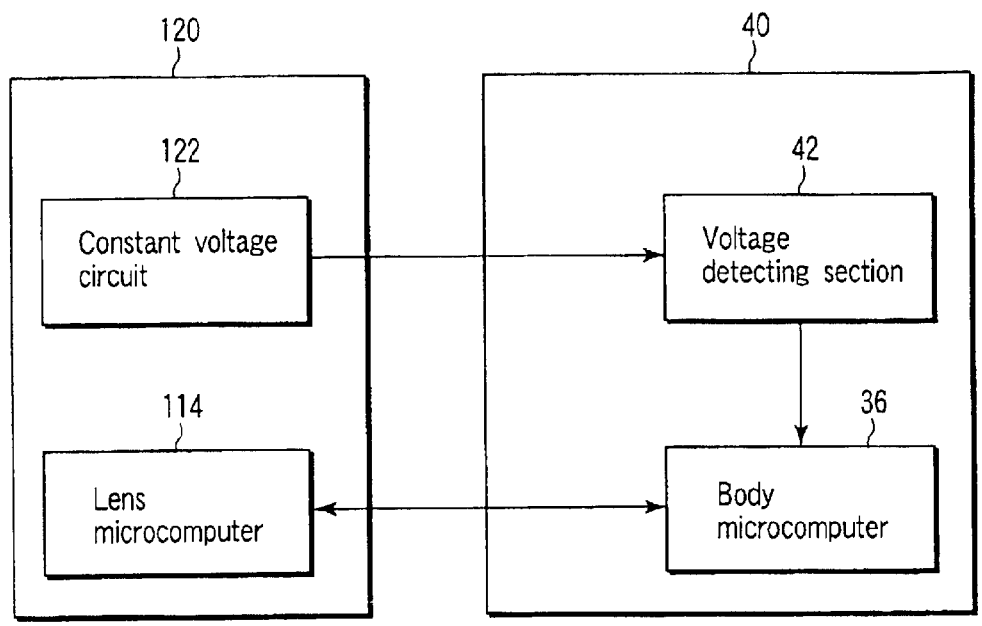
FIG. 7 is a block diagram of the second embodiment of the invention, illustrating an example of arrangement that is adapted to detect and determine a voltage value as hardware-related information.

FIG. 7 is a block diagram illustrating an example of arrangement that is adapted to detect and determine a voltage value as hardware-related information.

The interchangeable lens 120 comprises a constant voltage circuit 122 in place of the constant current source 116 of FIG. 6. The constant voltage circuit 122 outputs a constant voltage V showing a voltage value that represents its own attribute. It corresponds to the hardware-related information output section 112 and operates as state-indicating quantity holding means.

On the other hand, the camera body 40 comprises a voltage detecting section 42 in place of the electric current detecting section 34 of FIG. 6. The voltage detecting section 42 is adapted to detect the value of the constant voltage V output from the constant voltage circuit 122 and output the detected value. It corresponds to the hardware-related information judging section 32 and operate as second matching determining means.

Since the arrangement of FIG. 7 is identical with that of FIG. 6 except that a voltage value is detected as hardware-related information. It will not be described any further.

Figure 8:
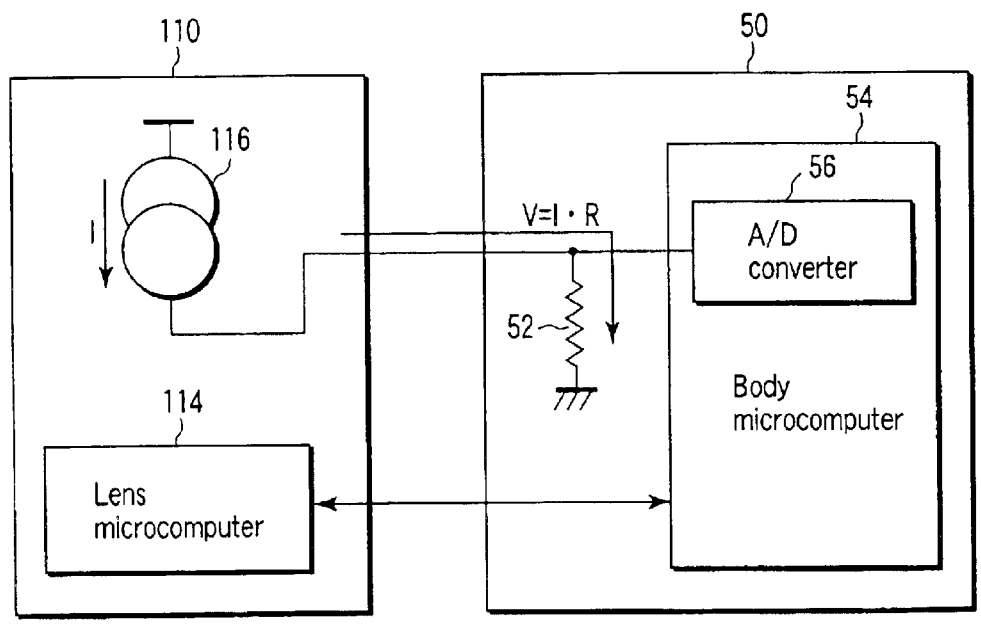
FIG. 8 is a block diagram of the second embodiment of the invention, illustrating another example of arrangement that is adapted to detect and determine an electric current value as hardware-related information.

FIG. 8 is a block diagram illustrating another example of arrangement that is adapted to detect and determine an electric current value as hardware-related information.

The interchangeable lens 110 of FIG. 8 is same as the one illustrated in FIG. 6.

On the other hand, the camera body 50 comprises a resistor 52 and a body microcomputer 54 in place of the electric current detecting section 34 and the body microcomputer 36 of FIG. 6.

The resistor 52 has a resistance value R and operates as part of the second matching determining means arranged on the input line of the constant electric current I output from the constant current source 116 and between the constant current source 116 and the ground. The body microcomputer 54 has an A/D converter 56 in the inside thereof that operates as second matching determining means for detecting the voltage value V=I×R produced by the resistor 52 and converting the detected voltage into a digital data. Since the arrangement of FIG. 8 is otherwise identical with that of FIG. 6, it will not be described any further.

Figure 9:
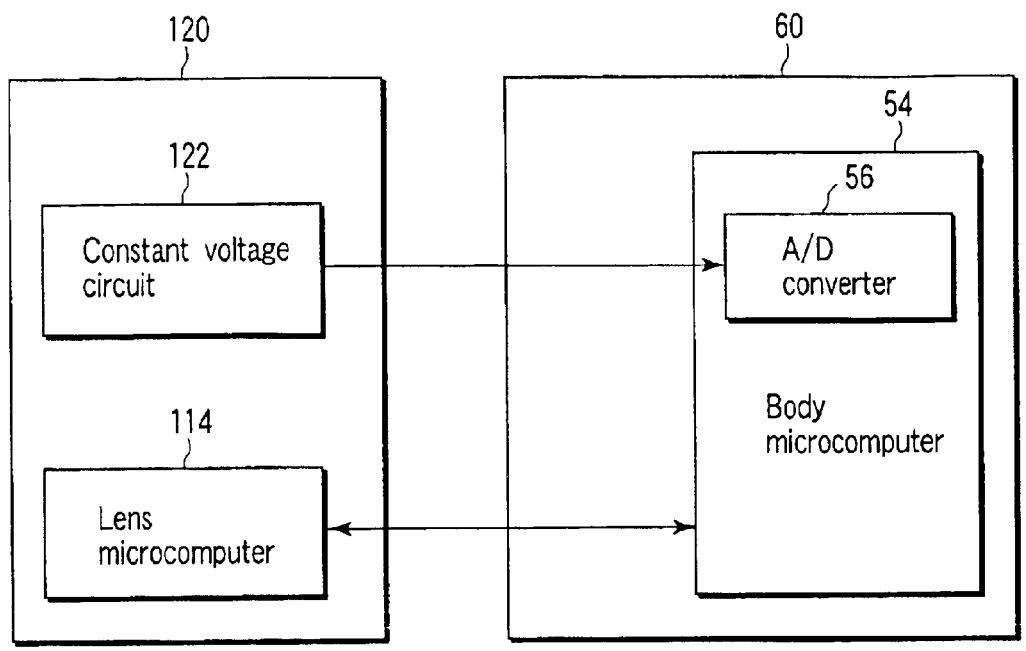
FIG. 9 is a block diagram of the second embodiment of the invention, illustrating another example of arrangement that is adapted to detect and determine a voltage value as hardware-related information.

FIG. 9 is a block diagram illustrating another example of arrangement that is adapted to detect and determine a voltage value as hardware-related information.

The interchangeable lens 120 of FIG. 9 is same as the one illustrated in FIG. 7.

On the other hand, the camera body 60 comprises a body microcomputer 54 that includes an A/D converter 56 similar to the one described above by referring to FIG. 8 but does not comprise any voltage detecting section 42 described above by referring to FIG. 7. Since the arrangement of FIG. 9 is otherwise identical with that of FIG. 7, it will not be described any further.

Figure 10:
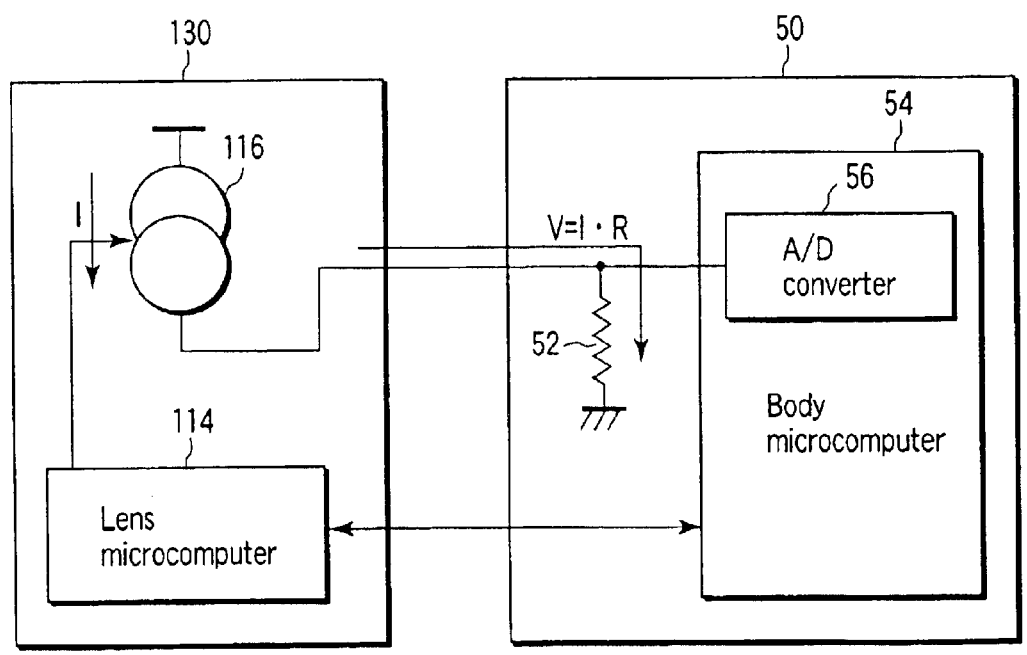
FIG. 10 is a block diagram of the second embodiment of the invention, illustrating still another example of arrangement that is adapted to detect and determine an electric current value as hardware-related information.

FIG. 10 is a block diagram illustrating still another example of arrangement that is adapted to detect and determine an electric current value as hardware-related information.

With the arrangement of FIG. 10, hardware-related information is used only to detect if the interchangeable lens 130 matches the camera body 50. In other words, it is not used to detect the focal length or some other attribute of the interchangeable lens 130.

The body microcomputer 54 has a coding section (not shown) in the inside thereof. It prepares a command for indicating the electric current value output from the interchangeable lens 130 connected to it and encodes the command by means of the coding section. Then, it transmits the coded command to the lens microcomputer 114 of the interchangeable lens 130.

The lens microcomputer 114 of the interchangeable lens 130 has a decoding section (not shown) in the inside thereof (the decoding section is included in the communicating section 102 if the interchangeable lens has a configuration corresponding to that of FIG. 5). Thus, it decodes the coded command it receives from the body microcomputer 54 and sets the electric current I output from the constant current source 116 to a value specified by the decoded command. In other words, the constant current source 116 of the interchangeable lens 130 is variable.

Since the arrangement of FIG. 10 is otherwise identical with that of FIG. 8, it will not be described 5 any further.

With the above described arrangement, the body microcomputer 54 detects the electric current value of the electric current I output from the interchangeable lens 130. If the interchangeable lens 130 is a matching one or not is determined depending on if the detected electric current value agrees with the one specified by the body microcomputer 54 by way of the command it issued.

In other words, for the interchangeable lens 130 to prove that it matches the camera body 50, the interchangeable lens 130 has to have a decoding section that corresponds to the coding section of the camera body 50 and a means for outputting the electric current value of the electric current I that corresponds to the command from the camera body 50.

Figure 11:
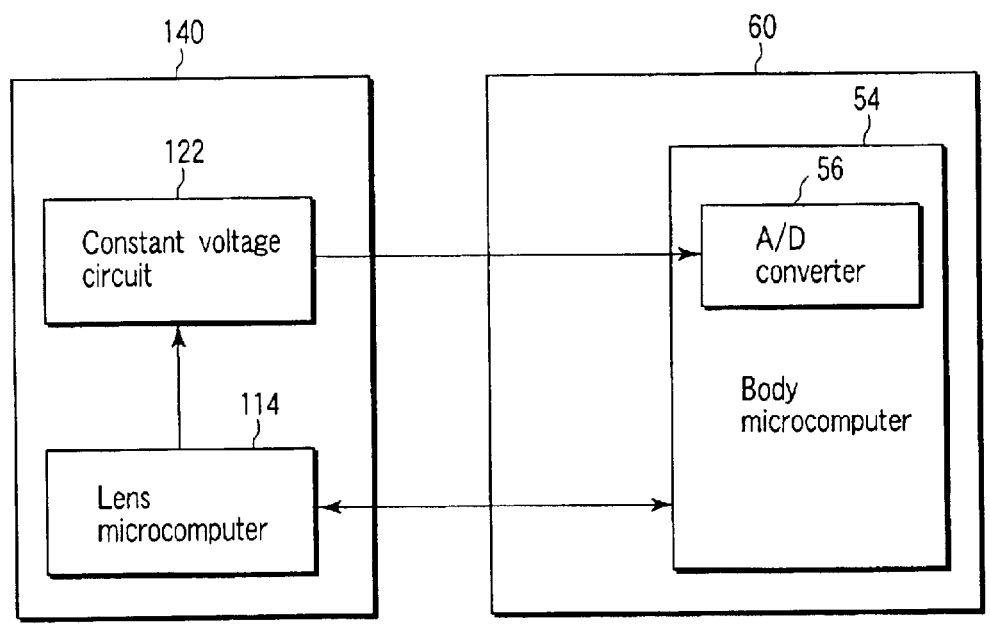
FIG. 11 is a block diagram of the second embodiment of the invention, illustrating still another example of arrangement that is adapted to detect and determine a voltage value as hardware-related information.

FIG. 11 is a block diagram illustrating still another example of arrangement that is adapted to detect and determine a voltage value as hardware-related information.

In this example, as in the case of the example of FIG. 10, hardware-related information is used only to detect if the interchangeable lens 140 matches the camera body 60. In other words, it is not used to detect the focal length or some other attribute of the interchangeable lens 140.

The body microcomputer 54 has a coding section (not shown) in the inside thereof. It prepares a command for indicating the voltage value output from the interchangeable lens 140 connected to it and encodes the command by means of the coding section. Then, it transmits the coded command to the lens microcomputer 114 of the interchangeable lens 140.

The interchangeable lens 140 has a decoding section (not shown) in the inside thereof. Thus, it decodes the coded command it receives from the body microcomputer 54 and sets the voltage V output from the constant voltage circuit 122 to a value specified by the decoded command. In other words, the constant voltage circuit 122 of the interchangeable lens 140 is variable.

The arrangement of FIG. 11 is identical to that of FIG. 6 in any other aspects. The body microcomputer 54 determines the applicability of the interchangeable lens 140 in the same way as in the case explained with reference to FIG. 10. The process of determining the applicability will not described.

The communication including encoding and decoding performed in the second embodiment may be realized by using such identification data utilized in the first embodiment.

Figure 12:
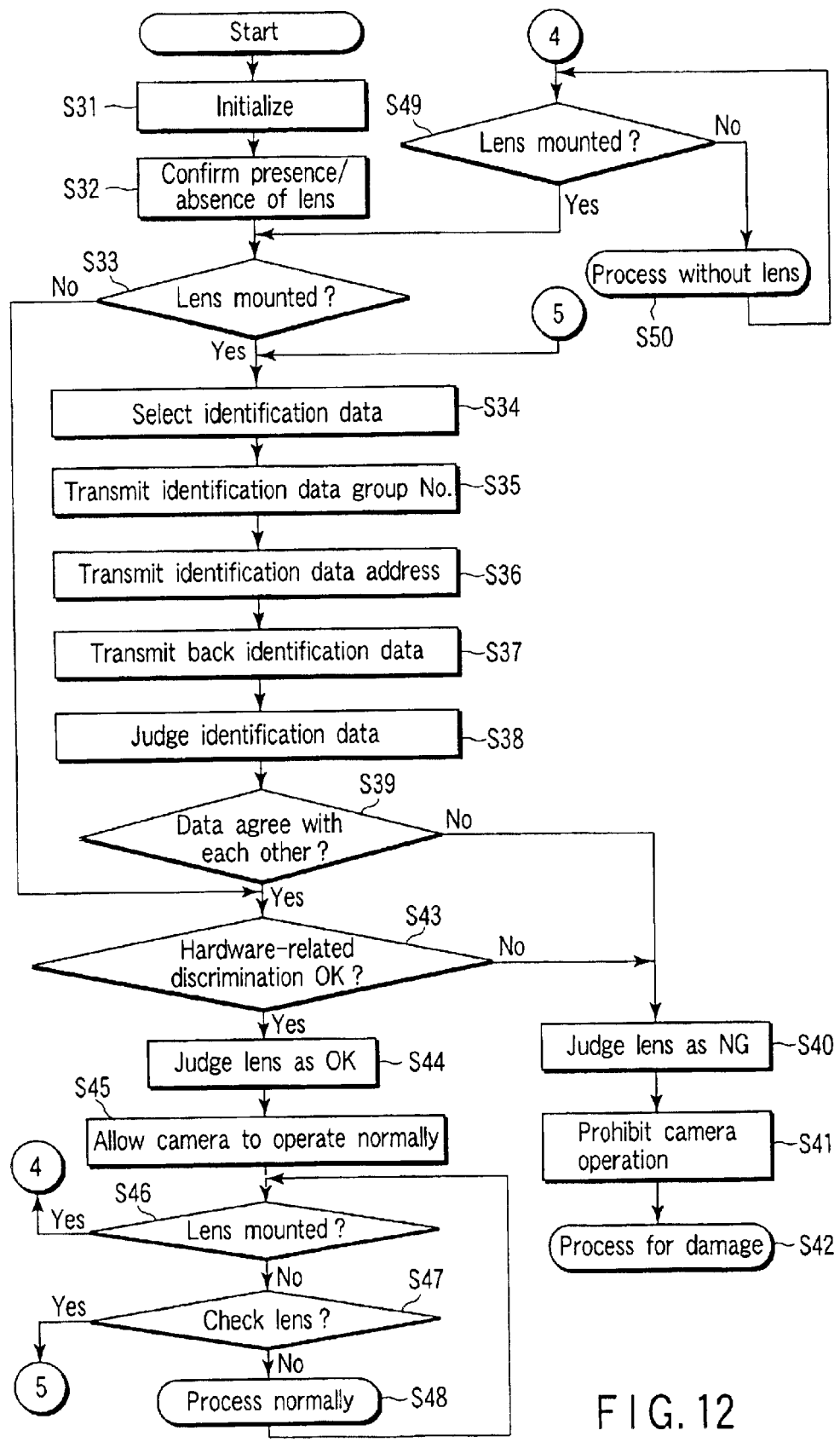
FIG. 12 is a flow chart of the operation of the camera body of the second embodiment of the invention.

Now, the operation of the camera body 30 of the second embodiment will be described by referring to the flowchart of FIG. 12.

As the camera system is operated, it is initialized in Step S31. The initialization includes checks of components and selections of initial values for them. Then, in Step S32, it is determined if an interchangeable lens 110 is mounted on the camera body 30 or not according to the result of the detecting operation of the lens mounting/releasing switch 22. In Step S33, it is determined if an interchangeable lens 110 is newly mounted on the camera body 30 or not according to the result of the detecting operation.

If it is determined that the interchangeable lens 110 is newly mounted on the camera body 30, it is confirmed if the interchangeable lens 110 is a matching lens or not by means of a communication protocol as described below before starting communications and other operations.

If it is determined that an interchangeable lens 110 is newly mounted on the camera body 30, the processing operation proceeds to Step S34, where a group number and Addresses X and Y are specified to select an identification data typically by generating random numbers.

Then, in Step S35, the group number of the identification data is transmitted to the communicating section 102 of the interchangeable lens 110 by way of the communicating section 12. Thereafter, in Step S36, Addresses X and Y of the identification data are transmitted. In the next step of S37, the camera body 30 waits for the identification data transmitted back from the interchangeable lens 110 and, as the identification data is transmitted back, it is received by way of the communicating section 12 in Step S38.

Then, in Step S39, the identification data judging section 18 compares the identification data including the group number and Addresses X and Y and read out from the identification data storage section 16 and the identification data received from the interchangeable lens 110. According to the result of the comparison, the section 18 determines if they agree with each other or not.

If the two identification data do not agree with each other, the processing operation proceeds to Step S40, where it is determined that the interchangeable lens 110 is not properly matching. As a result, any operation of the camera is prohibited in Step S41 and the processing operation proceeds to Step S42, in which a predetermined damage routine is conducted. With this arrangement, the camera system does not work for any image pickup operation if an interchangeable lens 110 that does not match the camera body 30 is mounted on the latter.

If, on the other hand, it is determined in Step S33 that no interchangeable lens 110 is mounted on the camera body 30 or the two identification data agree with each other in Step S39, the processing operation proceeds to Step S43. Then, the hardware-related information judging section 32 determines if the interchangeable lens 110 mounted on the camera body 30 is a matching one or not in a manner as described above by referring to the corresponding one of FIGS. 6 through 11.

If it is determined in Step S43 that the interchangeable lens 110 is not a matching one, the processing operation goes back to Step S40. If, on the other hand, it is determined that the interchangeable lens 110 is a matching one, the processing operation proceeds to Step S44.

In Step S43, it is determined if the interchangeable lens 110 mounted on the camera body 30 is properly matching or not. Subsequently, in Step S45, a proper sequence of operation is conducted for the camera.

Thereafter, a normal processing operation is conducted for the purpose of operating the camera. In this normal processing loop, if the interchangeable lens 110 is released from the camera body 30 or not is checked at regular time intervals by the lens mounting/releasing switch 22 in Step S46.

If it is determined that the interchangeable lens 110 is not released, the processing operation proceeds to Step S47, where it is determined if a command for checking the lens is issued by the user or not. If it is determined in Step S47 that a command for checking the lens is issued, the processing operation goes to Step S34 for a lens checking operation which is conducted in a manner as described above. On the other hand, if it is determined in Step S47 that no command is issued for checking the lens, a normal processing operation is conducted in Step S48. Then, the processing operation goes to Step S46 for the normal processing loop.

If it is detected by the lens mounting/releasing switch 22 in Step S46 that the interchangeable lens 110 is released from the camera body 30, the processing operation proceeds to Step S49. In Step S49, it is determined if an interchangeable lens 110 is mounted on the camera body 30 again or not.

If it is determined that an interchangeable lens 110 is mounted on the camera body 30 again, the processing operation goes back to Step S33. If, on the other hand, it is determined that no interchangeable lens 110 is mounted, the processing operation proceeds to Step S50 in order to deal with a situation where no interchangeable lens 110 is mounted. Thereafter, the processing operation returns to Step S49 and the camera body waits for an interchangeable lens 110 to be mounted on it.

Figure 13:
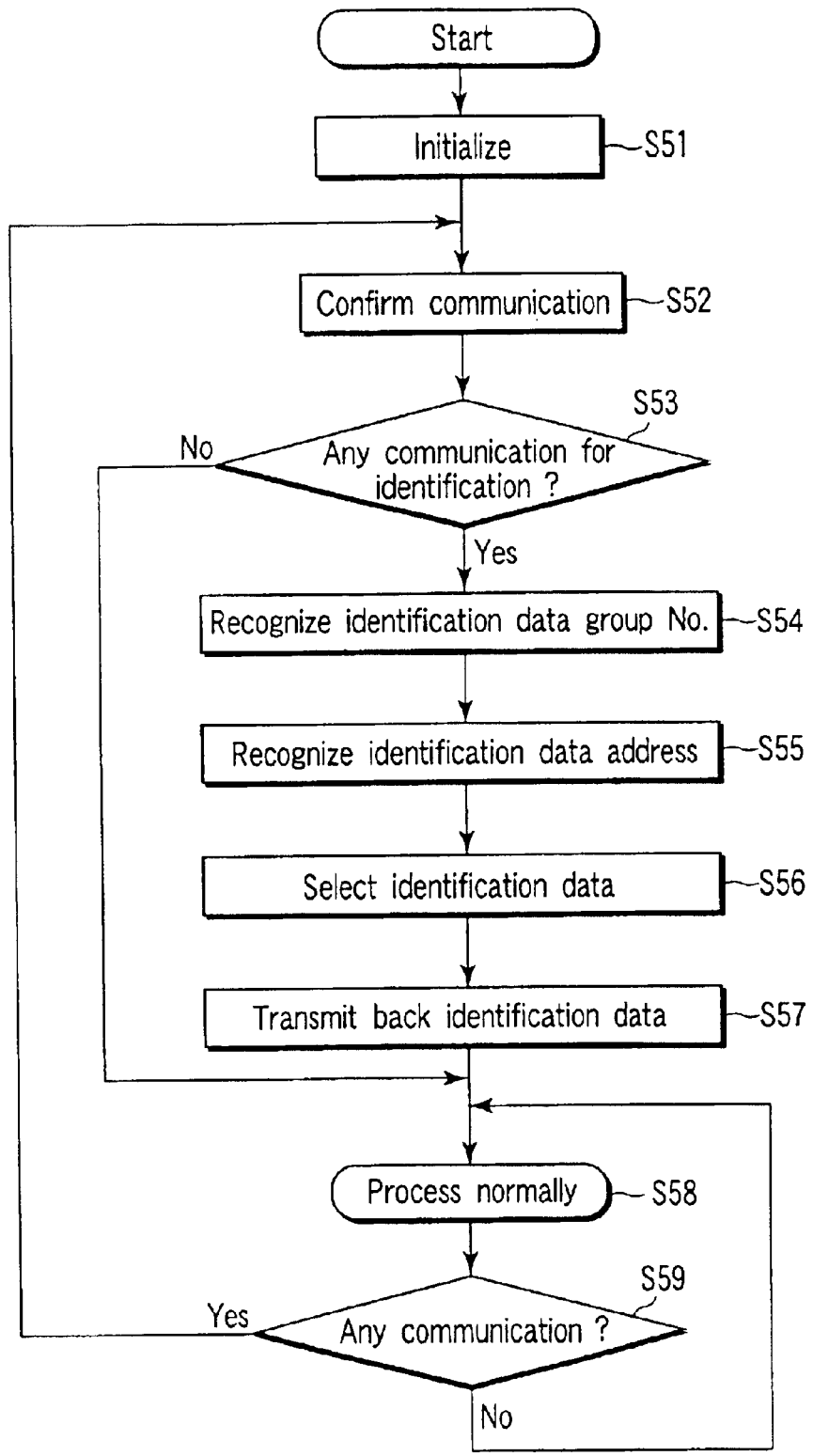
FIG. 13 is a flow chart of the operation of the interchangeable lens of the second embodiment of the invention.

Now, the processing operation on the part of the interchangeable lens 110 will be described by referring to the flow chart of FIG. 13.

This processing operation is started when the interchangeable lens 110 is connected to the camera body 30.

As the processing operation starts, firstly the interchangeable lens 110 is initialized in Step S51. The initialization may typically include selection of a port. Then, in Step S52, the interchangeable lens 110 waits for a notification of a data communication to be conducted that is transmitted from the communicating section 12 of the camera body 30 and received by the communicating section 102.

Then, in Step S53, it is determined if the received notification of a data communication is for an identification data or not. If it is determined that the received notification is for an identification data, the processing operation proceeds to Step S54, where the group number transmitted from the camera body 30 in Step S35 is received and recognized.

Thereafter, in Step S55, Addresses X and Y of the identification data transmitted from the camera body 30 in Step S36 are received and recognized. Then, in Step S56, the recognized group number and Addresses X and Y of the identification data are read out from the identification data storage section 16. Additionally, in Step S57, the read out identification data is transmitted back to the communicating section 12 of the camera body 30 from the communicating section 102.

If it is determined that the operation of Step S57 is terminated or the notification of a data communication is determined to be not for an identification data in Step S53, the ordinary processing operation for driving the lens is conducted in Step S58.

During the ordinary processing operation, it is determined in Step S59 if the camera body 30 requests a communication or not at regular time intervals. If it is determined that the camera body 30 requests a communication, the processing operation goes to Step S52 for the above described operation. If, on the other hand, it is determined that the camera body 30 does not request any communication, the ordinary processing loop is resumed.

Thus, the second embodiment of the invention is adapted to accurately recognize if the interchangeable lens mounted on the camera body is a properly matching one or not. Additionally, the camera system can be driven to operate only when a properly matching interchangeable lens that is accurately recognized to be as such is mounted on the camera body of the camera system to remarkably improve the reliability of the entire camera system.

Now, the third and fourth embodiments of the present invention will be described below.

In each of the third and fourth embodiments of the invention, which will be described below, both the camera and the accessory have arithmetic expressions to be commonly used by them. More specifically, the data to be used for arithmetic operations including a plurality of numerical value data are prepared and transmitted to the accessory along with the data specified at the camera side and the outcome of the arithmetic operations performed at the accessory side on the basis of the data to be used for arithmetic operations is transmitted to the camera. If the outcome of the arithmetic operations performed by itself agrees with the outcome of the arithmetic operations performed by the accessory, the camera judges that the accessory is a right one. Therefore, it is possible to accurately judge if the accessory is a right one or not and prevent a fake accessory prepared by some other person from being illegally used with the camera.

The data to be used for arithmetic operations may include a plurality of arithmetic expressions and predetermined arithmetic expressions may be selected from them and specified for use.

The third embodiment of the invention will be described below.

Figure 14:
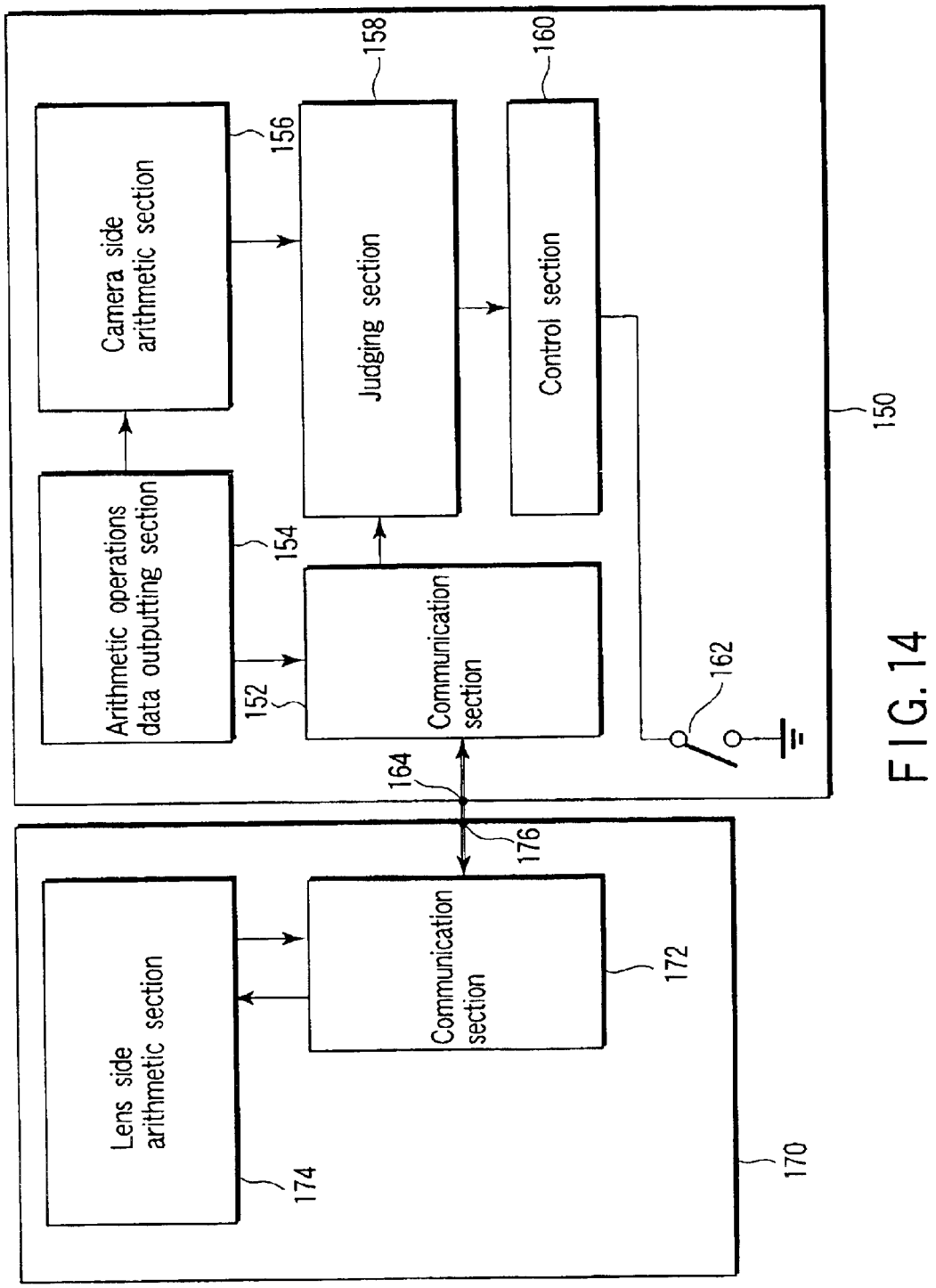
FIG. 14 is a functional block diagram of the third embodiment of the invention, which is a camera system, formed on the basis of the flow of signals to illustrate its configuration.

FIG. 14 is a functional block diagram of the third embodiment of the invention, which is a camera system, formed on the basis of the flow of signals to illustrate its configuration.

As shown in FIG. 14, the camera system comprises a camera body 150 and an interchangeable lens 170 that can be releasably mounted on the camera body 150 as accessory. The camera body 150 has a communication section 152 that can communicate with the interchangeable lens 170 for data communications, an arithmetic operations data outputting section 154, a camera side arithmetic section 156, a judging section 158, a control section 160 and a lens mounting/releasing switch (SW) 162.

On the other hand, the interchangeable lens 170 is an accessory that can be releasably mounted on the camera body 150. The interchangeable lens 170 has a communication section 172 that is adapted to communicate with the camera body 150 and a lens side arithmetic section 174. The fitting section of the camera body 150 and that of the interchangeable lens 170 are provided with respectively connection terminals 164, 176. When the camera body 150 and the interchangeable lens 170 are put together correctly, the connection terminal 164 and the connection terminal 176 contact each other so that the communication section 152 of the camera and the communication section 172 of the lens are electrically connected to each other.

The communication section 152 of the camera body 150 and the lens side communication section 172 are so adapted that the camera body 150 and the interchangeable lens 170 can mutually exchange data.

The arithmetic operations data outputting section 154 of the camera body 150 that outputs a plurality of numerical value data. The plurality of numerical value data is transmitted to the camera side arithmetic section 156 of the camera body 150. The plurality of numerical value data is also transmitted to the lens side arithmetic section 174 by way of the communication section 152 of the camera body 150 and the lens side communication section 172.

The camera side arithmetic section 156 in the camera body 150 and the lens side arithmetic section 174 store arithmetic expressions that are common to them. Predetermined arithmetic operations are performed, using the plurality of numerical value data that is transmitted to each of the arithmetic sections.

The outcome of the arithmetic operations performed by the camera side arithmetic section 156 is sent to the judging section 158 in the camera body 150. The outcome of the arithmetic operations performed by the lens side arithmetic section 174 is sent to the judging section 158 in the camera body 150 by way of the lens side communication section 172 and the camera side communication section 152.

The judging section 158 in the camera body 150 compares the outcomes of the two arithmetic sections 156, 174. If they agree with each other as a result of the comparison, it is so judged that the mounted interchangeable lens is a right lens. The control section 160 in the camera body 150 controls the operation of the camera according to the result of judgment of the judging section 158.

A lens mounting/releasing switch (SW) 162 that detects if the interchangeable lens 170 is mounted on or released from the camera body is connected to the control section 160. Thus, the control section 160 is notified of the timing of mounting the interchangeable lens 170 to and that of releasing the lens 170 from the camera body.

Now, the data that is output from the arithmetic operations data outputting section 154 for arithmetic operations will be described below in detail along with the arithmetic operations.

As shown in FIG. 15, the data to be used for an arithmetic operation include data of six numerical values. Of the data, the first data (data No. 1) indicates the data that is selected from the subsequent five data (data No. 2 through No. 6) so as to be actually used for an arithmetic operation. In other words, only one of the five data is used for an arithmetic operation and all the remaining data are dummy data.

The arithmetic operation will be described further below with reference to FIG. 15 that shows an example.

Referring to FIG. 15, the first data "3" indicates the third one of the subsequent five data, or "9" of data No. 4. The six data of numerical values are output from a random number generating section (not shown) contained in the arithmetic operations data outputting section 154. Each time, the random number generating section outputs a data string that differs from any of the preceding data strings.

Both the camera side arithmetic section 156 in the camera body 150 and the lens side arithmetic section 174 perform respective arithmetic operations, using a common arithmetic expression. For the purpose of convenience, assume here that the arithmetic expression is $$f(x)=ax+b \tag{1}$$

where x is the data to be used for the arithmetic operation and a and b are constants.

As pointed out above, if the interchangeable lens is a right lens, it stores arithmetic expressions that are common to the camera and the interchangeable lens. Therefore, the outcome of the arithmetic operation is same for both the camera body and the interchangeable lens. However, since the arithmetic expressions and the data selection algorithm for selecting data to be used for arithmetic operation are not exposed to the manufacturer of the fake lens, the outcome of the arithmetic operation performed by the fake lens is not the same as the outcome of the arithmetic operation of the camera side arithmetic section 156. Therefore, the camera body judges that the interchangeable lens is not a right lens when the outcome of the arithmetic operation produced from the interchangeable lens is not the same as that of the arithmetic operation of the camera side arithmetic section 156.

When the camera side arithmetic section 156 and the lens side arithmetic section 174 receive the six data, they firstly refer to data No. 1 to extract the data to be used for the arithmetic operation.

Now, a digital single-lens reflex camera with interchangeable lenses realized by applying the present invention will be described below with reference to FIG. 16.

This camera system comprises as principal components a camera body 180 and a lens barrel 190 that correspond respectively to the camera body 150 and the interchangeable lens 170 shown in FIG. 14. A desired lens barrel 190 can be releasably fitted to the front surface of the camera body 180.

The lens barrel 190 is controlled by a lens control microcomputer (to be referred to as L$\mu$com hereinafter) 192, which L$\mu$com 192 includes the communication section 172 and the lens side arithmetic section 174 of FIG. 14.

The camera body 180 is controlled by a body control microcomputer (to be referred to as B$\mu$com hereinafter) 210, which B$\mu$com 210 includes the communication section 152, the arithmetic operations data outputting section 154, the camera side arithmetic section 156, the judging section 158 and the a control section 160 of FIG. 14.

L$\mu$com 192 and B$\mu$com 210 are electrically connected to each other by way of a communication connector 206 at the time of putting them together so that they can communicate with each other. The communication connector 206 corresponds to the connection terminals 164 and 176 of FIG. 14.

In the camera system, L$\mu$com 192 cooperates with B$\mu$com 210 as subordinate.

An imaging optical system 194 and a diaphragm 196 are arranged in the lens barrel 190. The imaging optical system 194 is driven by a DC motor (not shown) arranged in lens drive mechanism 198. The diaphragm 196 is driven by a stepping motor (not shown) arranged in a diaphragm drive mechanism 200.

L$\mu$com 192 controls these motors according to the commands issued from B$\mu$com 210.

Figure 16:
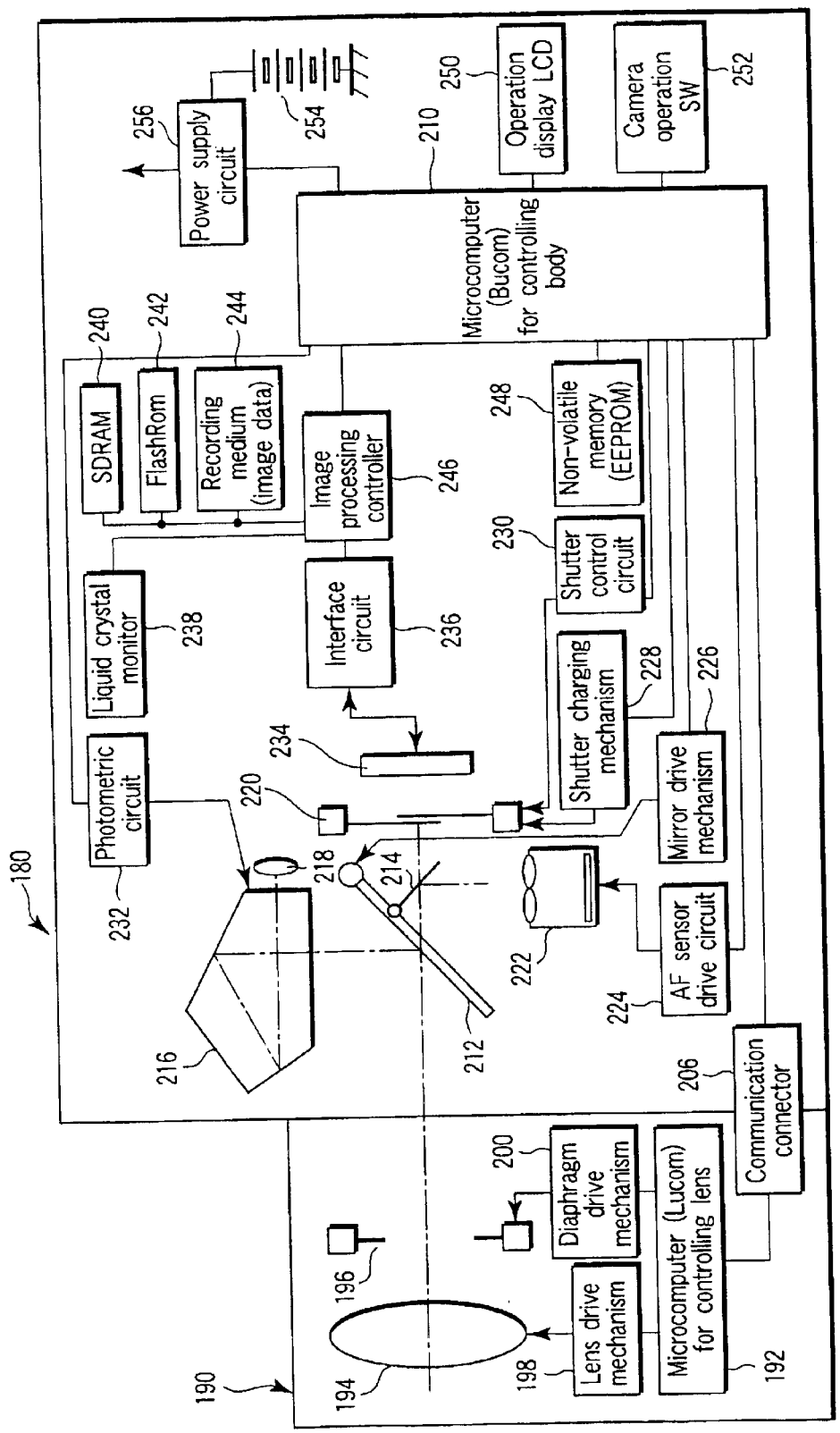
FIG. 16 is a schematic block diagram of a single-lens reflex camera with interchangeable lenses realized by applying the present invention.

The camera body 180 contains therein the following components in a manner as schematically illustrated in FIG. 16.

The components typically include optical components required for a single-lens reflex camera (a reflector 212, a sub-mirror 214, a pentaprism 216 and an eyepiece 218). The camera body 180 also contains therein a focal plane type shutter 220 arranged on the optical axis thereof and an AF sensor unit 222 that automatically focuses on the object to be shot upon receiving the flux of light reflected by the sub-mirror 214.

The camera body 180 additionally contains therein an AF sensor drive circuit 224 that drives and controls the AF sensor unit 222, a mirror drive mechanism 226 that drives and controls the reflector 212, a shutter charging mechanism 228 that charges the spring for driving the front curtain and the rear curtain of the shutter 220 with resilient force, a shutter control circuit 230 that controls the movement of the front curtain and that of the rear curtain and a photometric circuit 232 that operates for photometric on the basis of the flux of light from the pentaprism 216.

An imaging device 234 that is a photoelectric conversion device for photoelectrically converting the image of the object that is picked up and made to pass through the imaging optical system is arranged on the optical axis.

The camera system further comprises an interface circuit 236 connected to the imaging device 234, a liquid crystal monitor 238 and an image processing controller 246 that processes images by utilizing an SDRAM 240, a flash ROM 242, a recording medium 244 and the like that are provided as storage regions so that it has electronically recording/displaying functional features as well as electronically imaging functional features.

A non-volatile memory 248 that is typically an EEPROM and can be accessed from B$\mu$com 210 is provided as non-volatile memory means in order to store predetermined control parameters that are necessary for controlling the camera.

The B$\mu$com 210 comprises an operation display LCD 250 for notifying the user of the operating status of the camera by means of a display output, a camera operation switch (SW) 252, a battery 254 that operates as power source and a power supply circuit 256.

The camera operation switch 252 is provided as a group of switches that typically include a release switch, a mode-shifting switch and a power switch that are necessary for operating the camera. Many of the switches are realized in the form of operation buttons. The power supply circuit 256 is provided in order to change the voltage of the battery 254 operating as power source to the voltages that are required by the circuit units of the camera system. The above listed components of the camera system having the above described configuration operate in a manner as described below.

The image processing controller 246 controls the interface circuit 236 so as to take in the image data of the imaging device 234 according to the command issued from the B$\mu$com 210. The image data is then converted into a video signal by the image processing controller 246 and output to and displayed on the liquid crystal monitor 238. The user can confirm the picked up image by seeing the image displayed on the liquid crystal monitor 238.

The SDRAM 240 is a memory for temporarily storing the image data. It is used as a work area for the operation of converting the image data. The image data is also converted into a JPEG data and stored in the recording medium 244.

The mirror drive mechanism 226 is adapted to drive the reflector 212 either to an UP position or to a DOWN position. When the reflector 212 is at the DOWN position, the flux of light entering through the imaging optical system 194 is divided into a flux of light that is led to the AF sensor unit 222 and a flux of light that is led to the pentaprism 216.

The output from the AF sensor in the AF sensor unit 222 is transmitted to the B$\mu$com 210 by way of the AF sensor drive circuit 224. With this arrangement, an operation of measuring the distance is performed in a known manner.

The user can visually observe an image of the object to be shot through the eyepiece 218 located adjacent to the pentaprism 216. The flux of light passing through the pentaprism 216 is partly led to a photo sensor (not shown) arranged in the photometric circuit 232 so that a photometric operation is performed on the basis of the detected quantity of light in a known manner.

Now, the operation of the camera body 180 will be described below with reference to FIG. 17.

Figure 17:
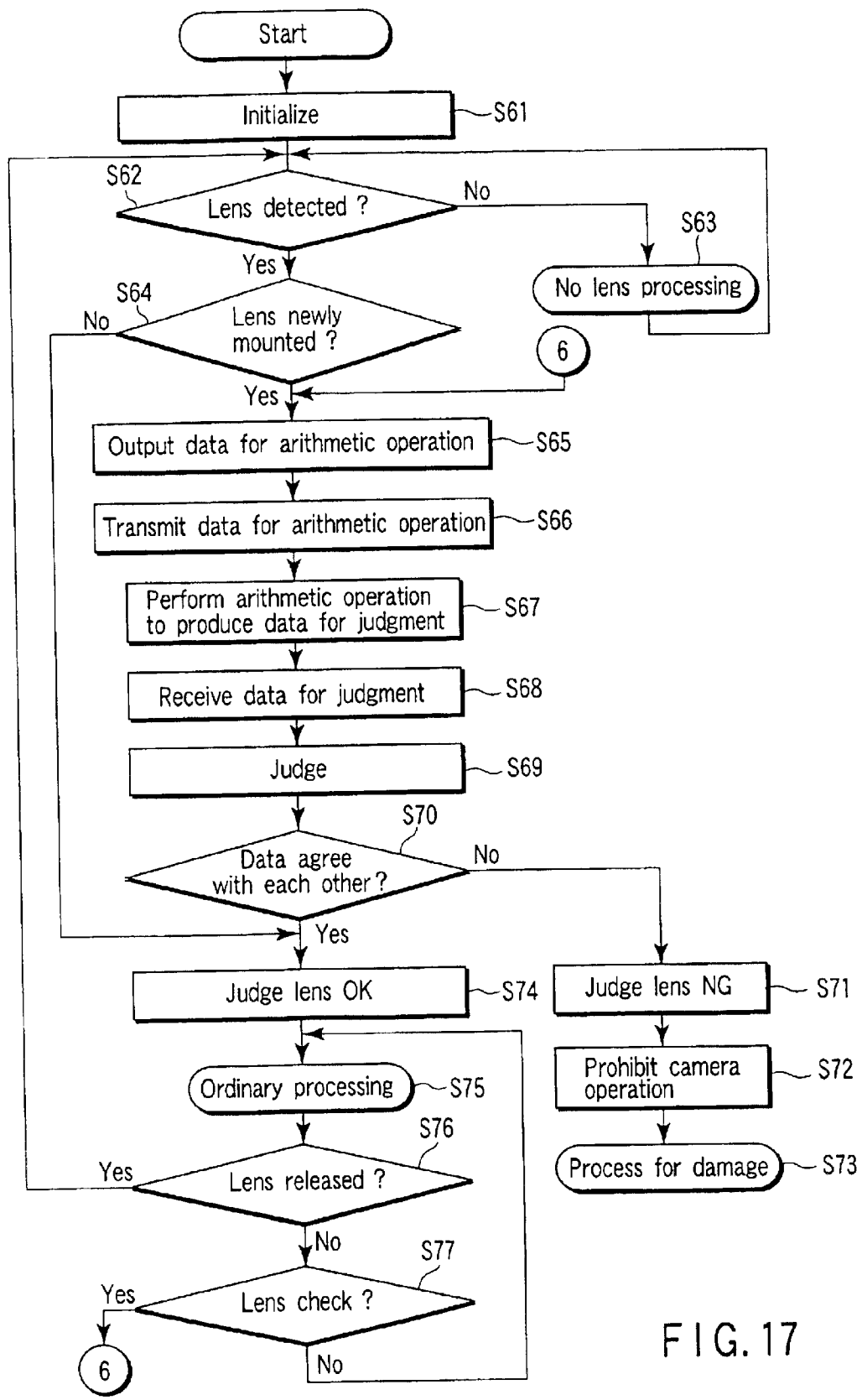
FIG. 17 is a flow chart illustrating the sequence of operation of the camera body 180 of the camera of FIG. 16.

FIG. 17 is a flow chart illustrating the sequence of operation of the camera body 180.

The illustrated sequence of operation starts as the camera body 180 is powered by the power source. Then, firstly in Step S61, the camera is initialized in an ordinary manner so that a necessary port may be selected. Then, in Step S62, it is determined if the lens barrel 190 is fitted to the camera body 180 or not. This operation is performed by means of a detection signal from the camera operation switch 252 that includes a leans mounting/releasing switch 162.

If the lens barrel 190 is not fitted to the camera body 180, the operation sequence proceeds to Step S63, where a processing operation for a no lens situation is performed. Subsequently, the operation sequence moves to Step S62.

If, on the other hand, it is found in Step S62 that the lens barrel 190 is fitted to the camera body 180, the operation sequence proceeds to Step S64, where it is determined if the lens barrel 190 is newly fitted to the camera body 180 (and hence a lens changing operation has been performed) or it has been fitted for sometime. If it is determined that the lens barrel 190 is newly fitted to the camera body 180, the lens identification process from Step S65 is started. If, on the other hand, it is determined that the lens barrel 190 has been fitted to the camera body 180 for sometime, the operation sequence proceeds to Step S74.

In Step S65, the data to be used for arithmetic operations are output from the arithmetic operations data outputting section 154 in the camera body 180. Then, in Step S66, the data to be used for arithmetic operations output in Step S65 are transmitted to the lens barrel 190 from the camera body 180.

In Step S67, predetermined arithmetic operations are performed by using the data to be used for the operations. Note that arithmetic operations similar to those of Step S67 are performed also in L$\mu$com 192 of the lens barrel 190.

In Step S68, the outcome of the arithmetic operations that are performed by using the data transmitted in Step S66 is then transmitted from the lens barrel 190. Then, the outcome of the arithmetic operations is assessed in Step S69. In other words, the outcome of the arithmetic operations performed by the camera side arithmetic section 156 in the camera body 180 and that of the arithmetic operations transmitted from the lens barrel 190 and received in Step S68 are compared.

Then, in Step S70, it is determined if the two outcomes agree with each other or not. If the two outcomes do not agree with each other as a result of the comparison, the operation sequence proceeds to Step S71, where the lens is judged to be NG. Thus, any subsequent operations are prohibited in the next Step S72. Subsequently, the operation sequence proceeds to Step S73, where a damage operation is performed to prohibit any operations that may be performed at the user side.

Alternatively, only operations relating to the lens barrel 190 may be prohibited.

If, on the other hand, it is found in Step S70 that the two outcomes agree with each other, the operation sequence proceeds to Step S74, where the lens is judged to be OK. Thus, normal operations (including shooting operations) are allowed to be performed by the camera in the next Step S75.

In the next Step S76, it is determined if the lens barrel 190 is released or not. The operation sequence proceeds to Step S62 if it is found that the lens barrel 190 is released from the camera body 180, whereas the operation goes to Step S77 if it is found that the lens barrel 190 is not released from the camera body 180.

In Step S77, it is determined if a processing operation of identifying the lens barrel 190 is to be performed or not. This processing operation of identifying the lens barrel 190 is triggered by a user operation of turning on the power switch, the release switch or the like. The operation sequence moves back to Step S65 to perform the processing operations of the subsequent steps if it is determined that the processing operation of identifying the lens barrel 190. is to be performed.

If, on the other hand, it is determined that the processing operation of identifying the lens barrel 190 is not to be performed, the operation sequence proceeds to Step S75, where an ordinary processing operation is performed. Then, the operation sequence proceeds to Step S76, where the loop of ordinary processing operations is repeated except when it is determined that the lens is to be released and checked in Steps S76 and S77 respectively.

When L$\mu$com 192 of the lens barrel 190 receives six numerical values from the camera body 180 in response to the above described processing operation in Step S66, it selects the data to be used for the predetermined arithmetic operation out of the numerical values. Then, the predetermined arithmetic operation is performed by using the selected data and the outcome of the arithmetic operation is transmitted to the camera body 180.

As for the data selection, a numerical value is selected from five numerical values according to the remaining numerical value (the first numerical value), the five numerical values being the second through sixth numerical values.

Now, the fourth embodiment of the invention will be described below.

Figure 18:
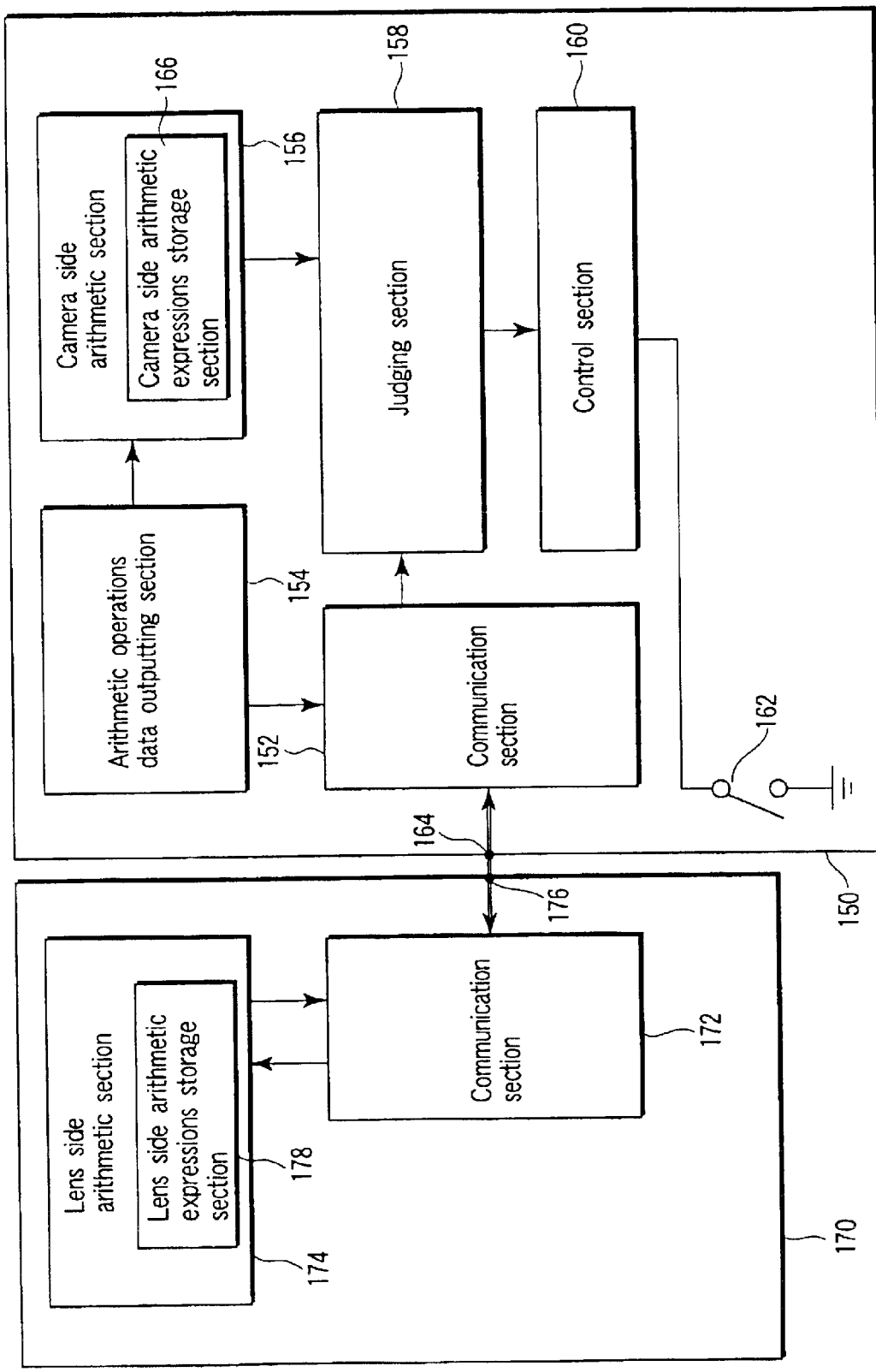
FIG. 18 is a functional block diagram of the fourth embodiment of the invention, which is a camera system, formed on the basis of the flow of signals to illustrate its configuration.

FIG. 18 is a functional block diagram of the fourth embodiment of the invention, which is a camera system, formed on the basis of the flow of signals to illustrate its configuration.

In FIG. 18, the components same as or similar to those of the third embodiment illustrated in FIG. 14 are denoted respectively by the same reference symbols and will not be described any further. In other words, only the components that are different from the third embodiment will be described below.

While both the camera side and the lens side are provided with only a single arithmetic expression in the above described third embodiment, the fourth embodiment differs from the third embodiment in that the camera side and the lens side are provided with a plurality of arithmetic expressions in the fourth embodiment.

More specifically, the camera side arithmetic section 156 has a camera side arithmetic expressions storage section 166 that stores a plurality of arithmetic expressions. On the other hand, the lens side arithmetic section 174 has a lens side arithmetic expressions storage section 178 that stores the arithmetic expressions same as those stored in the camera side arithmetic expressions storage section 166. Therefore, the plural numerical values output from the arithmetic operations data outputting section 154 outputs data to be used for arithmetic operations include a data for specifying one of the arithmetic expressions.

This will be described further with reference to FIG. 19 that illustrates an example.

To begin with, assume that the camera side arithmetic expressions storage section 166 and the lens side arithmetic expressions storage section 178 store the following three arithmetic expressions (2), (3) and (4) that are common to them;

$$f(x)=ax+b \quad (2),$$

$$f(x)=cx+d \quad (3) \text{ and}$$

$$f(x)=ex+f \quad (4),$$

where x is the data to be used for the selected arithmetic operation and a, b, c, d, e and f are constants.

The data to be used to the selected arithmetic operation that are output from the arithmetic operations data outputting section 154 include the first through seventh numerical values. The first numerical value (data No. 1) is used to specify the arithmetic expression out of the plurality of numerical expressions stored in the camera side arithmetic expressions storage section 166 and the lens side arithmetic expressions storage section 176.

The next numerical value (data No. 2) is used to specify the numerical value out of the subsequent five numerical values (data No. 3 through No. 7) so as to be actually used for an arithmetic operation as in the case of the third embodiment.

Referring to FIG. 19, the first data "3" indicates the third one of the arithmetic expressions is to be used and the second data "2" indicates the second one of the subsequent five data, or data No. 4 "9" is to be used for the x in the arithmetic expression.

On the other hand, upon receiving the seven data from the camera body, L$\mu$com 192 of the lens barrel 190 selects the arithmetic expression to be used according to the first data of the seven data and then selects the data to be used for the x in the selected arithmetic expressions out of the remaining data according to the second data of the seven data. Then, it performs an arithmetic operation, using the selected arithmetic expression and the selected numerical value and transmits the outcome of the arithmetic operation to the camera body.

With the above described arrangement, it is possible to rigorously recognize if the interchangeable lens mounted to the camera body is a right one or a wrong one.

While the first and fourth embodiments are described above in terms of an interchangeable lens as accessory, the present invention is equally applicable to other accessories such as a flash unit and a battery pack to provide similar advantages.

Thus, as described above in detail, the present invention provides a camera system comprising a camera body that can recognize if the accessory mounted on it is a valid one or a fake one.

Additionally, as described above in detail, the present invention provides a camera comprising a camera body that can recognize if the accessory mounted on it is a valid one or a fake one.

Furthermore, as described in detail, the present invention provides a method of judging and controlling an accessory, with which a camera body can recognize if the accessory mounted it is a valid one or a fake one.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera system comprising:
   a camera body; and
   an accessory device to be releasably mounted on the camera body;
   wherein the camera body comprises a camera side identification data table, a specifying section which specifies an appropriate data address to the accessory device, and a judging section;
   wherein the accessory device comprises an accessory device side identification data table congruous with at least one part of the camera side identification data table, and a transmitting section which transmits the identification data stored in the accessory device side identification data table at the data address specified by the specifying section to the camera body; and
   wherein the judging section is adapted to determine if a dedicated accessory is mounted by comparing the identification data transmitted back from the accessory device and the identification data stored in the camera side identification data table at the address corresponding to the data address.

2. The camera system according to claim 1, wherein each of the camera body and the accessory device comprises a plurality of identification data tables, and wherein the camera body specifies one of the plurality of identification data tables and an appropriate address of the specified table to the accessory device.

3. The camera system according to claim 1, wherein the accessory device comprises an interchangeable lens that is releasably mounted on the camera body.

4. The camera system according to claim 1, wherein the accessory device comprises a flash unit that is releasably mounted on the camera body.

5. The camera system according to claim 1, wherein the accessory device comprises a battery pack that is releasably mounted on the camera body.

6. An accessory device to be releasably mounted on a camera body having a functional feature of determining if an accessory device dedicated to the camera body is mounted thereon, the accessory device comprising:

an identification data table held congruous with at least one part of a camera side identification data table provided in the camera body; and a transmitting section which selects an identification data in the identification data table and transmits the selected identification data to the camera body in response to a specification by the camera body.

7. The accessory device according to claim 6, wherein the accessory device comprises an interchangeable lens that is releasably mounted on the camera body.

8. The accessory device according to claim 6, wherein the accessory device comprises a strobe unit that is releasably mounted on the camera body.

9. The accessory device according to claim 6, wherein the accessory device comprises a battery pack that is releasably mounted on the camera body.

10. A camera body having a functional feature of determining if an accessory device designed to be dedicated to the camera body is mounted thereon, the camera body comprising:

an identification data table including an accessory side identification data table held by the accessory device;

a specifying section which specifies an appropriate data address to the accessory device; and a judging section which determines if the dedicated accessory device is mounted thereon by comparing (i) identification data corresponding to the specified data address of the accessory side identification data table and transmitted back from the accessory device according to a specification by the specifying section, and (ii) identification data stored in the camera side identification data table at an address corresponding to the specified data address.

11. The camera body according to claim 10, wherein the accessory device comprises an interchangeable lens that is releasably mounted on the camera body.

12. The camera body according to claim 10, wherein the accessory device comprises a strobe unit that is releasably mounted on the camera body.

13. The camera body according to claim 10, wherein the accessory device comprises a battery pack that is releasably mounted on the camera body.

14. A camera system comprising:

a camera body; and an accessory device to be releasably mounted on the camera body;

wherein the camera body comprises a camera side memory section storing identification data congruous with identification data stored in the accessory device, a detecting section which detects a predetermined operation by a user, a comparing section, and a judging section;

wherein the accessory device comprises an accessory device side memory section storing identification data congruous with the identification data stored in the camera body;

wherein the comparing section is arranged in the camera body to receive identification data from the accessory device when the predetermined operation is detected by the detecting section, and to compare the identification data with corresponding camera side identification data;

wherein the judging section is adapted to judge if the dedicated accessory device is mounted on the camera body according to a result of comparison by the comparing section; and wherein a restricting section inhibits/restricts operation of the camera thereafter if the judging section judges that the dedicated accessory device is not mounted on the camera body.

15. The camera system according to claim 14, further comprising:

a specifying section arranged in the camera body to specify an appropriate data address to the accessory device when the predetermined operation is detected by the detecting section; and a transmitting section arranged in the accessory device to transmit the identification data stored in the accessory device side identification data table to the camera body according to the specified data address.

16. The camera system according to claim 15, wherein each of the camera side memory section and the accessory device side memory section comprises a plurality of data tables formed by a plurality of identification data, and wherein the camera body specifies one of the plurality of data tables and an appropriate address of the specified table to the accessory device.

17. The camera system according to claim 14, wherein the accessory device comprises an interchangeable lens that is releasably mounted on the camera body.

18. The camera system according to claim 14, wherein the accessory device comprises a strobe unit that is releasably mounted on the camera body.

19. The camera system according to claim 14, wherein the accessory device comprises a battery pack that is releasably mounted on the camera body.

20. A camera system comprising a camera body and an accessory to be releasably mounted on the camera body, the system comprising:

a camera side arithmetic section arranged in the camera body to store an arithmetic expression to be used for performing a predetermined arithmetic operation;

an accessory side arithmetic section arranged in the accessory to store an arithmetic expression congruous with the arithmetic expression of the camera side arithmetic section;

an arithmetic operation data outputting section arranged in the camera body to output arithmetic operation data common to the camera side arithmetic section and the accessory side arithmetic section; and a judging section arranged in the camera body to compare an outcome of the arithmetic operation performed by the camera side arithmetic section and an outcome of the arithmetic operation performed by the accessory side arithmetic section and to judge that a right accessory is mounted on the camera body when the outcomes agree with each other.

21. The camera system according to claim 20, wherein the arithmetic operation data outputting section outputs a plurality of numerical values, and both the camera side arithmetic section and the accessory side arithmetic section perform the arithmetic operations using a same numerical value selected from the plurality of numerical values.

22. The camera system according to claim 20, wherein the arithmetic operation data include data to be used for the arithmetic operations and dummy data.

23. The camera system according to claim 20, wherein the arithmetic operation data include a plurality of numerical value data including data for specifying data to be used for the arithmetic operations, data to be used in the arithmetic operations, and dummy data.

24. The camera system according to claim 20, wherein the arithmetic operation data include a plurality of numerical value data, and wherein the camera side arithmetic section and the accessory side arithmetic section have a plurality of arithmetic expressions in common, and are adapted to select one of the plurality of arithmetic expressions by using specific data selected from the plurality of numerical value data output from the arithmetic operation data outputting section.

25. The camera system according to claim 24, wherein the plurality of numerical value data include data for specifying an arithmetic expression, data for specifying the data to be used for the arithmetic operations, data to be used in the arithmetic operations, and dummy data.

26. The camera system according to claim 20, wherein the arithmetic operation data outputting section includes a random number generating section and outputs the arithmetic operation data based on a random number generated by the random number generating section.

27. A camera to which an accessory to be releasably mounted, the camera comprising:

a camera side arithmetic section that stores an arithmetic expression congruous with an arithmetic expression stored in an accessory side arithmetic section possessed by the accessory;

an arithmetic operation data outputting section that outputs arithmetic operation data to the accessory side arithmetic section and the camera side arithmetic section; and a judging section that receives an outcome of an arithmetic operation of the camera side arithmetic section and an outcome of an arithmetic operation of the accessory side arithmetic section and judges if the accessory is a right accessory by comparing the outcomes.

28. The camera according to claim 27, wherein the camera becomes inoperative when the judging section judges that the accessory is not the right accessory.

29. A judgment control method to be used by an accessory that is to be releasably mounted on a camera body, the method comprising:

receiving at an accessory side a plurality of numerical value data from the camera body;

selecting data to be used for an arithmetic operation for judgment control of the accessory out of the plurality of numerical value data;

performing the arithmetic operation for judgment control of the accessory using the selected data; and transmitting an outcome of the arithmetic operation for judgment control to the camera body.

30. A judgment control method to be used by an accessory that is to be releasably mounted on a camera body, the method comprising:

receiving at an accessory side a plurality of numerical value data from the camera body;

selecting data to be used for an arithmetic operation for judgment control of the accessory out of the plurality of numerical value data according to a specific one of the plurality of numerical value data;

performing the arithmetic operation for judgment control of the accessory using the selected data; and transmitting an outcome of the arithmetic operation for judgment control to the camera body.

31. A judgment control method to be used by an accessory that is to be releasably mounted on a camera body, the method comprising:

receiving at an accessory side a plurality of data from the camera body;

determining an arithmetic expression to be used for an arithmetic operation for judgment control of the accessory according to first data of the plurality of data;

selecting third data from the plurality of data according to second data of the plurality of data;

performing the arithmetic operation for judgment control of the accessory using the selected arithmetic expression and the selected third data; and transmitting an outcome of the arithmetic operation for judgment control to the camera body.

32. A camera system comprising a camera body and an interchangeable lens to be releasably mounted on the camera body, the system comprising:

a camera side arithmetic section arranged in the camera body to store an arithmetic expression to be used for performing a predetermined arithmetic operation;

a lens side arithmetic section arranged in the interchangeable lens to store an arithmetic expression congruous with the arithmetic expression of the camera side arithmetic section;

an arithmetic operation data outputting section arranged in the camera body to output arithmetic operation data common to the camera side arithmetic section and the lens side arithmetic section; and a judging section arranged in the camera body to compare an outcome of the arithmetic operation performed by the camera side arithmetic section and an outcome of the arithmetic operation performed by the lens side arithmetic section and to judge that a right interchangeable lens is mounted on the camera body when the outcomes agree with each other.

33. The camera system according to claim 32, wherein the arithmetic operation data outputting section outputs a plurality of numerical values and both the camera side arithmetic section and the lens side arithmetic section perform the arithmetic operations using a same numerical value selected from the plurality of numerical values.

34. The camera system according to claim 32, wherein the arithmetic operation data include data to be used for the arithmetic operations and dummy data.

35. The camera system according to claim 32, wherein the arithmetic operation data include a plurality of numerical value data including data for specifying the data to be used for the arithmetic operations, data to be used in the arithmetic operations, and dummy data.

36. The camera system according to claim 32, wherein the arithmetic operation data include a plurality of numerical value data, and
wherein the camera side arithmetic section and the lens side arithmetic section have a plurality of arithmetic expressions in common and are adapted to select one of the plurality of arithmetic expressions by using specific data selected from the plurality of numerical value data output from the arithmetic operation data outputting section.

37. The camera system according to claim 36, wherein the plurality of numerical value data include data for specifying an arithmetic expression, data for specifying the data to be used for the arithmetic operations, data to be used in the arithmetic operations, and dummy data.

38. The camera system according to claim 32, wherein the arithmetic operation data outputting section includes a random number generating section and outputs the arithmetic operation data based on a random number generated by the random number generating section.

39. A camera to which an interchangeable lens is to be releasably mounted, the camera comprising:
a camera side arithmetic section that stores an arithmetic expression congruous with an arithmetic expression stored in an lens side arithmetic section in the interchangeable lens;
an arithmetic operation data outputting section that outputs arithmetic operation data to the lens side arithmetic section and the camera side arithmetic section;
a judging section that receives an outcome of an arithmetic operation of the camera side arithmetic section and an outcome of an arithmetic operation of the lens side arithmetic section and judges if the interchangeable lens is a right interchangeable lens by comparing the outcomes.

40. The camera according to claim 39, wherein the camera becomes inoperative when the judging section judges that the interchangeable lens is not the right interchangeable lens.

41. A judgment control method to be used by an interchangeable lens that is to be releasably mounted on a camera body, the method comprising:
receiving at interchangeable lens side a plurality of numerical value data from the camera body;
selecting data to be used for an arithmetic operation for judgment control of the interchangeable lens out of the plurality of numerical value data;
performing the arithmetic operation for judgment control of the interchangeable lens using the selected data; and
transmitting an outcome of the arithmetic operation for judgment control to the camera body.

42. A judgment control method to be used by an interchangeable lens that is to be releasably mounted on a camera body, the method comprising:
receiving at an interchangeable lens side a plurality of numerical value data from the camera body;
selecting data to be used for an arithmetic operation for judgment control of the interchangeable lens out of the plurality of numerical value data according to a specific one of the plurality of numerical value data;
performing the arithmetic operation for judgment control of the interchangeable lens using the selected data; and
transmitting an outcome of the arithmetic operation for judgment control to the camera body.

43. A judgment control method to be used by an interchangeable lens that is to be releasably mounted on a camera body, the method comprising:
receiving at an interchangeable lens side a plurality of data from the camera body;
determining an arithmetic expression to be used for an arithmetic operation for judgment control of the interchangeable lens according to a first data of the plurality of data;
selecting a third data from the plurality of data according to a second data of the plurality of data;
performing the arithmetic operation for judgment control of the interchangeable lens using the selected arithmetic expression and the selected third data; and
transmitting an outcome of the arithmetic operation for judgment control to the camera body.

44. A camera system comprising a camera body and an accessory device to be releasably mounted on the camera body, the camera system further comprising:
a camera side identification data table in the camera body;
an accessory device side identification data table in the accessory device, which is at least partially congruous with the camera side identification data table;
a specifying section arranged in the camera body to specify a data address, which is selected in accordance with a predetermined method, to the accessory device;
a transmitting section arranged in the accessory device to transmit identification data stored in the accessory device side identification data table to the camera body in accordance with the data address specified by the specifying section;
a detection switch to detect whether the accessory device is mounted on the camera body; and
a judging section arranged in the camera body to judge whether a dedicated accessory device is mounted by, at least when the detection switch detects that the accessory device is mounted on the camera body, comparing the identification data transmitted by the accessory device to identification data stored in the camera side identification data table and corresponding to the data address;
wherein operation of the camera system is restricted when the judging section judges that the dedicated accessory is not mounted, relative to operation of the camera system when the judging section judges that the dedicated accessory is mounted.

45. The camera system according to claim 44, wherein each of the camera body and the accessory device has a plurality of identification data tables, and wherein the camera body specifies one of the plurality of identification data tables and an appropriate address of the specified table to the accessory device.

46. The camera system according to claim 44, wherein the accessory device comprises at least one of an interchangeable lens, a flash unit and a battery pack, which is releasably mounted on the camera body.

47. The camera system according to claim 44, wherein the camera body is prohibited from operating when the judging section judges that the dedicated accessory is not mounted.

48. The camera system according to claim 44, wherein the accessory device is prohibited from operating when the judging section judges that the dedicated accessory is not mounted.

* * * * *